(12) United States Patent
Cui et al.

(10) Patent No.: US 6,574,651 B1
(45) Date of Patent: Jun. 3, 2003

(54) METHOD AND APPARATUS FOR ARITHMETIC OPERATION ON VECTORED DATA

(75) Inventors: Jeffrey Cui, Mountain View, CA (US); Stephane Rossignol, Santa Clara, CA (US); Lew G. Chua-Eoan, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/411,620

(22) Filed: Oct. 1, 1999

(51) Int. Cl.[7] .................................................. G06F 7/38
(52) U.S. Cl. ........................ 708/523; 708/524; 708/520
(58) Field of Search ............................... 708/518, 501, 708/503, 603, 607, 620, 622, 625, 626, 627, 628, 629, 630, 631, 632

(56) References Cited

U.S. PATENT DOCUMENTS

| | | |
|---|---|---|
| 4,467,444 A | 8/1984 | Harmon, Jr. et al. |
| 4,814,981 A | 3/1989 | Rubinfeld |
| 5,251,311 A | 10/1993 | Kasai |
| 5,386,565 A | 1/1995 | Tanaka et al. |
| 5,423,050 A | 6/1995 | Taylor et al. |
| 5,434,804 A | 7/1995 | Bock et al. |
| 5,440,705 A | 8/1995 | Wang et al. |
| 5,442,799 A * | 8/1995 | Murakami et al. ............. 712/36 |

(List continued on next page.)

FOREIGN PATENT DOCUMENTS

| | | |
|---|---|---|
| EP | 165600 B1 | 11/1991 |
| EP | 636976 B1 | 2/1995 |
| EP | 636976 A1 | 2/1995 |
| EP | 652516 A1 | 5/1995 |
| EP | 702239 A2 | 3/1996 |
| EP | 720092 A1 | 7/1996 |
| EP | 933926 A1 | 8/1999 |
| EP | 945805 A1 | 9/1999 |
| EP | 959411 A1 | 11/1999 |
| JP | 08320796 A | 12/1996 |
| JP | 08-329687 | 12/1996 |
| JP | 08329687 A | 12/1996 |
| JP | 09212358 A | 8/1997 |
| JP | 09311786 A | 12/1997 |
| JP | WO98/13759 | 4/1998 |
| JP | 10106269 A | 4/1998 |
| JP | 10124484 A | 5/1998 |
| JP | 10177520 A | 6/1998 |

OTHER PUBLICATIONS

Richard York; Real Time Debug for System–on–Chip Devices; Jun. 1999; pp. 1–6.

*Primary Examiner*—Chuong Dinh Ngo
(74) *Attorney, Agent, or Firm*—Townsend and Townsend and Crew LLP

(57) ABSTRACT

A method of multiplying 32-bit values includes decomposing each multiplicand into its 16-bit components. This approach leads to a processor core design which permits re-use of much of the logic in the multiplication unit. The multiplication unit includes a selector which can feed various-sized data formats to the same multiplier circuits. Multiple data transformation paths are provided and feed into a single compression circuit and a single configurable full adder circuit.

12 Claims, 8 Drawing Sheets

U.S. PATENT DOCUMENTS

| | | | |
|---|---|---|---|
| 5,448,576 | A | 9/1995 | Russell |
| 5,452,432 | A | 9/1995 | Macachor |
| 5,455,936 | A | 10/1995 | Maemura |
| 5,479,652 | A | 12/1995 | Dreyer et al. |
| 5,483,518 | A | 1/1996 | Whetsel |
| 5,488,688 | A | 1/1996 | Gonzales et al. |
| 5,530,965 | A | 6/1996 | Kawasaki et al. |
| 5,535,405 | A | 7/1996 | Byers et al. |
| 5,570,375 | A | 10/1996 | Tsai et al. |
| 5,590,354 | A | 12/1996 | Klapproth et al. |
| 5,596,734 | A | 1/1997 | Ferra |
| 5,598,551 | A | 1/1997 | Barajas et al. |
| 5,608,881 | A | 3/1997 | Masumura et al. |
| 5,613,153 | A | 3/1997 | Arimilli et al. |
| 5,627,842 | A | 5/1997 | Brown et al. |
| 5,655,133 | A | 8/1997 | Dupree et al. |
| 5,657,273 | A | 8/1997 | Ayukawa et al. |
| 5,682,545 | A | 10/1997 | Kawasaki et al. |
| 5,704,034 | A | 12/1997 | Circello |
| 5,708,773 | A | 1/1998 | Jeppesen, III et al. |
| 5,724,549 | A | 3/1998 | Selgas et al. |
| 5,737,516 | A | 4/1998 | Circello et al. |
| 5,751,621 | A | 5/1998 | Arakawa |
| 5,751,622 | A * | 5/1998 | Purcell .................. 708/625 |
| 5,768,152 | A | 6/1998 | Battaline et al. |
| 5,771,240 | A | 6/1998 | Tobin et al. |
| 5,774,701 | A | 6/1998 | Matsui et al. |
| 5,778,237 | A | 7/1998 | Yamamoto et al. |
| 5,781,558 | A | 7/1998 | Inglis et al. |
| 5,796,978 | A | 8/1998 | Yoshioka et al. |
| 5,828,825 | A | 10/1998 | Eskandari et al. |
| 5,832,248 | A | 11/1998 | Kishi et al. |
| 5,835,963 | A | 11/1998 | Yoshioka et al. |
| 5,848,247 | A | 12/1998 | Matsui et al. |
| 5,860,127 | A | 1/1999 | Shimazaki et al. |
| 5,862,387 | A | 1/1999 | Songer et al. |
| 5,867,726 | A | 2/1999 | Ohsuga et al. |
| 5,884,092 | A | 3/1999 | Kiuchi et al. |
| 5,896,550 | A | 4/1999 | Wehunt et al. |
| 5,918,045 | A | 6/1999 | Nishii et al. |
| 5,930,523 | A | 7/1999 | Kawasaki et al. |
| 5,930,833 | A | 7/1999 | Yoshioka et al. |
| 5,944,841 | A | 8/1999 | Christie |
| 5,950,012 | A | 9/1999 | Shiell et al. |
| 5,953,538 | A | 9/1999 | Duncan et al. |
| 5,956,477 | A | 9/1999 | Ranson et al. |
| 5,978,874 | A | 11/1999 | Singhal et al. |
| 5,978,902 | A | 11/1999 | Mann |
| 5,983,017 | A | 11/1999 | Kemp et al. |
| 5,983,379 | A | 11/1999 | Warren |
| 6,023,757 | A | 2/2000 | Nishimoto et al. |
| 6,038,582 | A | 3/2000 | Arakawa et al. |
| 6,038,583 | A * | 3/2000 | Oberman et al. ........... 708/628 |
| 6,038,661 | A | 3/2000 | Yoshioka et al. |
| 6,286,024 | B1 * | 9/2001 | Yano et al. ................. 708/625 |

* cited by examiner

700

METHOD AND APPARATUS FOR ARITHMETIC OPERATION ON VECTORED DATA

CROSS-REFERENCES TO RELATED APPLICATIONS

This application is related to U.S. application Ser. No. 09/610,683, filed Oct. 1, 1999, entitled "AN INTEGER INSTRUCTION SET ARCHITECTURE AND IMPLEMENTATION," and to U.S. application Ser. No. 09/910,998, filed Oct. 1, 1999, entitled "INSTRUCTIONS FOR ARITHMETIC OPERATIONS ON VECTORED DATA," all of which are commonly owned by the Assignee of the present application, the contents of which are incorporated herein by reference.

BACKGROUND OF THE INVENTION

The present invention relates to microprocessors and more specifically to techniques for manipulating vectored data.

Increased computer processing is required to provide for modem digital services. As an example, the Internet has spawned a plethora of multimedia applications for presenting images and playing video and audio content. These applications involve the manipulation of complex data in the form of still graphic images and full motion video. It is commonly accepted that digitized images consume prodigious amounts of storage. For example, a single relatively modest-sized image having 480×640 pixels and a full-color resolution of 24 bits per pixel (three 8-bit bytes per pixel), occupies nearly a megabyte of data. At a resolution of 1024×768 pixels, a 24-bit color image requires 2.3 MB of memory to represent. A 24-bit color picture of an 8.5 inch by 11 inch page, at 300 dots per inch, requires as much as 2 MB of storage. Video images are even more data-intensive, since it is generally accepted that for high-quality consumer applications, images must occur at a rate of at least 30 frames per second. Current proposals for high-definition television (HDTV) call for as many as 1920×1035 or more pixels per frame, which translates to a data transmission rate of about 1.5 billion bits per second. Other advances in digital imaging and multimedia applications such as video teleconferencing and home entertainment systems have created an even greater demand for higher bandwidth and consequently ever greater processing capability.

Traditional lossless techniques for compressing digital image and video information include methods such as Huffman encoding, run length encoding and the Lempel-Ziv-Welch algorithm. These approaches, though advantageous in preserving image quality, are otherwise inadequate to meet the demands of high throughput systems. For this reason, compression techniques which typically involve some loss of information have been devised. They include discrete cosine transform (DCT) techniques, adaptive DCT (ADCT) techniques, and wavelet transform techniques.

The Joint Photographic Experts Group (JPEG) has created a standard for still image compression, known as the JPEG standard. This standard defines an algorithm based on the discrete cosine transform (DCT). An encoder using the JPEG algorithm processes an image in four steps: linear transformation, quantization, run-length encoding (RLE), and Huffman coding. The decoder reverses these steps to reconstruct the image. For the linear transformation step, the image is divided up into blocks of 8×8 pixels and a DCT operation is applied in both spatial dimensions for each block. The purpose of dividing the image into blocks is to overcome a deficiency of the DCT algorithm, which is that the DCT is highly non-local. The image is divided into blocks in order to overcome this non-locality by confining it to small regions and doing separate transforms for each block. However, this compromise has the disadvantage of producing a tiled appearance which manifests itself visually by having a blockiness quality.

The quantization step is essential to reduce the amount of information to be transmitted, though it does cause loss of image information. Each transform component is quantized using a value selected from its position in each 8×8 block. This step has the convenient side effect of reducing the abundant small values to zero or other small numbers, which can require much less information to specify.

The run-length encoding step codes runs of same values, such as zeros, to produce codes which identify the number of times to repeat a value and the value to repeat. A single code like "8 zeros" requires less space to represent than a string of eight zeros, for example. This step is justified by the abundance of zeros that usually results from the quantization step.

Huffinan coding (a popular form of entropy coding) translates each symbol from the run-length encoding step into a variable-length bit string that is chosen depending on how frequently the symbol occurs. That is, frequent symbols are coded with shorter codes than infrequent symbols. The coding can be done either from a preset table or one composed specifically for the image to minimize the total number of bits needed.

Similarly to JPEG, the Motion Pictures Experts Group (MPEG) has promulgated two standards for coding image sequences. The standards are known as MPEG I and MPEG II. The MPEG algorithms exploit the common occurrence of relatively small variations from frame to frame. In the MPEG standards, a full image is compressed and transmitted only once for every 12 frames. These "reference" frames (so-called "I-frames" for intra-frames) are typically compressed using JPEG compression. For the intermediate frames, a predicted frame (P-frame) is calculated and only the difference between the actual frame and each predicted frame is compressed and transmitted.

Any of several algorithms can be used to calculate a predicted frame. The algorithm is chosen on a block-by-block basis depending on which predictor algorithm works best for the particular block. One technique called "motion estimation" is used to reduce temporal redundancy. Temporal redundancy is observed in a movie where large portions of an image remain unchanged from frame to adjacent frame. In many situations, such as a camera pan, every pixel in an image will change from frame to frame, but nearly every pixel can be found in a previous image. The process of "finding" copies of pixels in previous (and future) frames is called motion estimation. Video compression standards such as H.261 and MPEG 1 & 2 allow the image encoder (image compression engine) to remove redundancy by specifying the motion of 16×16 pixel blocks within an image. The image being compressed is broken into blocks of 16×16 pixels. For each block in an image, a search is carried out to find matching blocks in other images that are in the sequence being compressed. Two measures are typically used to determine the match. One is the sum of absolute difference (SAD) which is mathematically written as $$\sum_i \sum_j (|a_i - b_j|),$$

and the other is the sum of differences squared (SDS) which is mathematically written as $$\sum_i \sum_j (a_i - b_j)^2.$$

The SAD measure is easy to implement in hardware. However, though the SDS operation requires greater precision to generate, the result is generally accepted to be of superior quality.

For real time, high-quality video image decompression, the decompression algorithm must be simple enough to be able to produce 30 frames of decompressed images per second. The speed requirement for compression is often not as extreme as for decompression, since in many situations, images are compressed offline. Even then, however, compression time must be reasonable to be commercially viable. In addition, many applications require real time compression as well as decompression, such as real time transmission of live events; e.g., video teleconferencing.

Dedicated digital signal processors (DSPs) are the traditional workhorses generally used to carry out these kinds of operations. Optimized for number crunching, DSPs are often included within multimedia devices such as sound cards, speech recognition cards, video capture cards, etc. DSPs typically function as coprocessors, performing the complex and repetitive mathematical computations demanded by the data compression algorithms, and performing specific multimedia-type algorithms more efficiently than their general purpose microprocessor counterparts.

However, the never ending quest to improve the price/performance ratio of personal computer systems has spawned a generation of general purpose microprocessors which effectively duplicate much of the processing capacity traditionally provided by DSPs. One line of development is the reduced instruction set computer (RISC). RISC processors are characterized by a smaller number of instructions which are simple to decode, and by requiring that all arithmetic/logic operations be performed in register-to-register manner. Another feature is that there are no complex memory access operations. All memory accesses are register load/store operations, and there are a comparatively smaller number of relatively simpler addressing modes; i.e., only a few ways of specifying operand addresses. Instructions are of only one length, and memory accesses are of a standard data width. Instruction execution is of the direct hardwired type, as compared to microcoding. There is a fixed instruction cycle time, and the instructions are defined to be relatively simple so that they all execute in one or a few cycles. Typically, multiple instructions are simultaneously in various states of execution as a consequence of pipeline processing.

To make MPEG, JPEG, H.320, etc., more viable as data compression standards, enhancements to existing RISC architectures processors and to existing instruction sets have been made. Other modern digital services, such as broadband networks, set-top box CPU's, cable systems, voice-over IP equipment, and wireless products, conventionally implemented using DSP methodology, would also benefit by having increased processing capacity in a single general-purpose processor. More generally, digital filter applications which traditionally are implemented by DSP technology would benefit from the additional processing capability provided by a general-purpose processor having DSP capability.

The instruction set architecture (ISA) of many RISC processors include single-instruction-multi-data (SIMD) instructions. These instructions allow parallel operations to be performed on multiple elements of a vector of data with corresponding elements of another vector. These types of vector operations are common to many digital applications such as image processing. Another critical area is in the field of data encryption and decryption systems. Coding of information is important for secured transactions over the Internet and for wireless communication systems.

Therefore it is desirable to further enhance the performance of the RISC architecture. It is desirable to improve the performance capability of RISC processor cores to provide enhanced multimedia applications and in general to meet the computing power demanded by next generation consumer products. What is needed are enhancements of the ISA for vectored processing instructions. It is also desirable to provide an improved microarchitecture for a RISC-based processor in the areas of vectored data processing.

SUMMARY OF THE INVENTION

A method of multiplying 32-bit values includes splitting each multiplicand into two 16-bit values. For each multiplicand, the two 16-bit values can be summed to produce the original 32-bit datum. Thus, each 32-bit value has the form $(a_n + b_n)$. The product is $(a_1a_2 + a_1b_2 + a_2b_1 + b_1b_2)$. Multiplying the two multiplicands in this manner requires only 16-bit multipliers. The intermediate terms need to be multiplied by powers of two before summing to produce the correct result.

In accordance with the invention a processing core includes a multiplication unit comprising first, second, and third inputs for receiving data from a general purpose register file. The multiplication unit further comprises a first selector coupled to receive the inputs, a set of multiply circuits coupled to receive outputs of the first selector, a first, a second and a third transform path, a second selector coupled to receive the transform paths, a compression circuit coupled to receive an output of the second selector and to receive the third input, and an adder circuit coupled to receive outputs of the second selector.

The first selector selects subsets of its inputs and produces them in various sequences to the multiply circuits, depending on the decoded instruction. Each transform path produces a different data transformation on the outputs of the multiplier circuits. The second selector selects among the three transform paths and feeds the selected path to the compression circuit, also based on the decoded instruction. The adder circuit is selectively configured to provide four, two or a single full adder, again based on the decoded instruction.

The multiply circuits include overflow detection logic. Likewise, the adder circuit includes overflow detection logic. Saturation value generators are provided in the multiply circuits and in the adder circuit to provide saturation upon detecting overflow.

The configurability of the first selector to present its inputs in different sequences to the multiply circuits creates a flexible circuit for accommodating a variety of instructions. In particular, the same instruction can be implemented for different-sized data formats without having to provide circuitry customized for each format. The dual overflow detection logic also supports multiple data formats. In addition, overflow situations are more accurately handled since overflow detection occurs for intermediate results.

These and other advantages of the invention can be appreciated more fully from the following discussion of the various embodiments of the invention as shown in the figures and explained below.

DESCRIPTION OF THE SPECIFIC EMBODIMENTS

It is a characteristic in RISC architectures that its operations are register-to-register. The data sources are registers and the data destinations are registers. Consequently, a register file is provided as a pool of general purpose registers for the various integer operations typically performed by a central processing unit. In accordance with the invention, the general purpose registers comprising the register file are the data sources and data destinations for the various vectored operations disclosed and described below. To emphasize this fact, FIG. 1 explicitly shows a register file 102 of N general purpose registers $R_0$–$R_{n-1}$. Each register is sixty-four bits in length.

Figure 1:
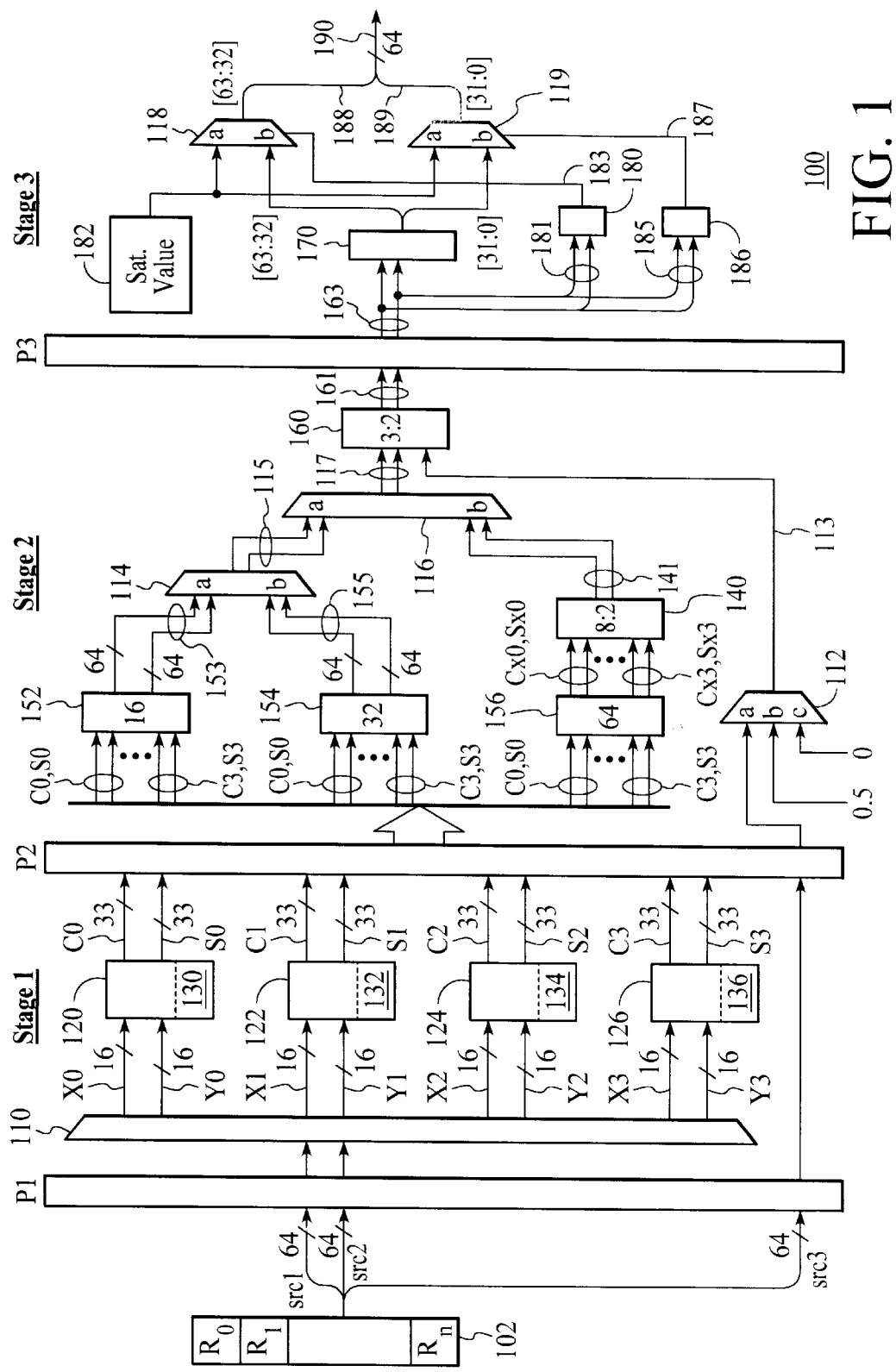
FIG. 1 shows a vectored multiplication unit in connection with certain multimedia instructions of the invention.

An aspect of the invention comprises improvements in the areas relating to multiplication operations of vectored data. FIG. 1 shows a simplified schematic of a multiplication unit 100 in accordance with the invention. In order to simplify the illustration of this otherwise complicated circuit, only the major functional blocks of the multiplication unit are highlighted. It will be understood by those of ordinary skill in the relevant arts that various control signals and other supporting logic, not otherwise germane to the discussion of the invention, are included.

The multiplication unit 100 is a three-stage pipelined processing unit. Each stage is separated from the other by pipeline latches P1, P2, and P3. Typically, the pipeline latches comprise a bank of flip-flops. Pipeline latches temporarily hold data from the previous stage between clock cycles. This serves to synchronize the flow of data from one stage to the next. The pipeline latches also serve to isolate the data between stages. This is important since an advantage of pipeline processing is that different instructions can be executing in each of the pipeline stages.

Multiplication unit 100 provides its inputs and outputs data via operands A, B, and C. Each operand is a 64-bit bus. Each 64-bit bus is coupled through logic (not shown) to one of the general purpose registers from register file 102. This establishes data communication between the multiplication unit and the register file. Typically, this occurs during an instruction decoding phase of processor operation.

As can be seen in FIG. 1, the 64-bit buses of operands A, B, and C feed into stage 1 via pipeline latch P1. Upon receiving a clocking signal, A, B, and C are clocked in and become source lines src1, src2, and src3, each source 'line' comprising 64 bitlines. Source line src1 and src2 feed into selector circuit 110, typically a multiplexer circuit. Source line src3 passes through stage 1, to pipeline latch P2 and into the second stage. Selector circuit 110 groups each source line, src1 and scr2, into four groups of wordlines. Thus, the 64 bitlines of source line src1 can be represented conventionally as src1 [63:0], bit positions 63-0. Selector circuit 110 groups src1 as:

src1[63:48], src2[47:32], src2[31:16], and src1[15:0].

Similarly, the 64 bitlines of src2 are grouped as:

src2[63:48], src2[47:32], src2[31:16], and src2[15:0].

For the purposes of the this application, "little endian" bit, byte (8 bits), and word (16 bits) ordering is used. In this convention, the higher order elements are stored in the higher-numbered bit positions. The alternative convention is "big endian," in which the higher order elements are stored in the lower-numbered bit positions.

Continuing with FIG. 1, selector circuit 110 provides four pairs of output lines, $x_3/y_3$, $x_2/y_2$, $x_1/y_1$, and $x_0/y_0$. Each output line comprises 16 bitlines. Selector circuit 110 is designed to map the eight 16-bit groups from src1 and src2 onto the eight wordlines $x_n$, $y_n$. Selector circuit 110 provides the following sequences, one for 16-bit multiplication and another for 32-bit multiplication. The significance of these sequences will become clear in the discussion of the instructions:

| 16-bit sequence | 32-bit sequence I | 32-bit sequence II |
|---|---|---|
| src1[63:48] ⇒ $x_3$ | src1[31:16] ⇒ $x_3$ | src1[63:48] ⇒ $x_3$ |
| src1[47:32] ⇒ $x_2$ | src1[31:16] ⇒ $x_2$ | src1[63:48] ⇒ $x_2$ |
| src1[31:16] ⇒ $x_1$ | src1[15:0] ⇒ $x_1$ | src1[47:32] ⇒ $x_1$ |
| src1[15:0] ⇒ $x_0$ | src1[15:0] ⇒ $x_0$ | src1[47:32] ⇒ $x_0$ |
| src2[63:48] ⇒ $y_3$ | src2[31:16] ⇒ $y_3$ | src2[63:48] ⇒ $y_3$ |
| src2[47:32] ⇒ $y_2$ | src2[15:0] ⇒ $y_2$ | src2[47:32] ⇒ $y_2$ |
| src2[31:16] ⇒ $y_1$ | src2[31:16] ⇒ $y_1$ | src2[63:48] ⇒ $y_1$ |
| src2[15:0] ⇒ $y_0$ | src2[15:0] ⇒ $y_0$ | src2[47:32] ⇒ $y_0$ |

The eight wordlines $x_n$, $y_n$ feed into four 16×16 multiplier circuits 120–126. Wordlines $x_0/y_0$ feed into circuit 120, wordlines $x_1/y_1$ feed into circuit 122, and so on. Each multiplier circuit 120–126 respectively includes overflow detection logic 130–136. The multiplier circuits produce four 33-bit sum lines, $s_3$–$s_0$, and four corresponding 33-bit carry lines, $c_3$–$c_0$. The extra bits on the sum and carry lines are sign bits produced in the multiplier circuits 120–126. The sum and carry lines feed into pipeline latch P2, separating stage 1 of multiplication unit 100 from the next stage, stage 2.

In stage 2, each of the four pairs of sum/carry lines $s_3/c_3$, $s_2/c_2$, $s_1/c_1$, $s_0/c_0$, are coupled to a 16-bit transposing circuit 152, a 32-bit transposing circuit 154, and a 64-bit transposing circuit 156. The transposing circuits each reorders the incoming 33-bit sum/carry pairs and pack them into a 64-bit sum/carry output pair. Depending on the transposing circuit, additional processing is performed. The significance of the transpositions will become clear in the discussion of the instruction set.

Transposing circuit 152 is used for 16-bit integer and fixed point multiplication operations. Its output 153 comprises a 64-bit sum line and a corresponding 64-bit carry line. Circuit 152 provides two transposition schemes for transposing the 33-bit sum/carry inputs to the 64-bit sum/carry output pair 153. For integer multiplication, only the lowest 16 bits of the four incoming 33-bit sum/carry pairs are packed into its 64-bit sum/carry output pair 153 namely, bits 0–15. For the fixed-point case, only the upper portion of the four 33-bit sum/carry pairs are packed into outputs 153. In particular, bit positions 15–30 are transferred. integer transposition.

integer transposition -
$s_3[15:0]$ ⇒ bit position [63:48] of sum output
$c_3[15:0]$ ⇒ bit position [63:48] of carry output
$s_2[15:0]$ ⇒ bit position [47:32] of sum output
$c_2[15:0]$ ⇒ bit position [47:32] of carry output
$s_1[15:0]$ ⇒ bit position [31:16] of sum output
$c_1[15:0]$ ⇒ bit position [31:16] of carry output
$s_0[15:0]$ ⇒ bit position [15:0] of sum output
$c_0[15:0]$ ⇒ bit position [15:0] of carry output fixed point transposition-
$s_3[30:15]$ ⇒ bit position [63:48] of sum output
$c_3[30:15]$ ⇒ bit position [63:48] of carry output
$s_2[30:15]$ ⇒ bit position [47:32] of sum output
$c_2[30:15]$ ⇒ bit position [47:32] of carry output
$s_1[30:15]$ ⇒ bit position [31:16] of sum output
$c_1[30:15]$ ⇒ bit position [31:16] of carry output
$s_0[30:15]$ ⇒ bit position [15:0] of sum output
$c_0[30:15]$ ⇒ bit position [15:0] of carry output Preferably, transposing circuit 152 comprises a set of bit-level muxes. Alternative implementations are possible, however.

Transposing circuit 154 is used for full-width 16-bit multiplication operations. Its output 155 comprises a 64-bit sum line and a 64-bit carry line. Circuit 154 transposes either the lower two pairs of the incoming 33-bit sum/carry inputs or the upper two pairs of the incoming 33-bit sum/carry inputs to its 64-bit sum/carry output pair:. Thus, $s_3[31:0]$ ⇒ bit position [63:32] of sum output
$c_3[31:0]$ ⇒ bit position [63:32] of cary output
$s_2[31:0]$ ⇒ bit position [31:0] of sum output
$c_2[31:0]$ ⇒ bit position [31:0] of carry output
or,
$s_1[31:0]$ ⇒ bit position [63:32] of sum output
$c_1[31:0]$ ⇒ bit position [63:32] of carry output
$s_0[31:0]$ ⇒ bit position [31:0] of sum output
$c_0[31:0]$ ⇒ bit position [31:0] of carry output.

Preferably, transposing circuit 154 comprises a set of multiplexers to select the upper or lower pairs of incoming sum/carry lines and to combine them to form the 64-bit output 155. The use for this circuit will become clear in the discussion relating to the instruction set. It is observed that the incoming sum and carry lines are 33 bits each. The uppermost bit (bit position 32), an extraneous sign bit in stage 2, is stripped during the transposition operation. For the MACFX.WL and MACNFX.WL instructions, bits [30:0] of $s_0/c_0$ and $s_1/c_1$ are transferred and a '0' is loaded into bit [0] of the sum and carry output.

Transposing circuit 156 is used for full-width 32-bit multiply operations. Its output comprises four pairs of sum and carry lines $sx_3/cx_3$, $sx_2/cx_2$, $sx_1/cx_1$, $sx_0/cx_0$, each 'line' being 64 bitlines wide. Circuit 156 maps each of the incoming sum/carry pairs $s_3/c_3$, $s_2/c_2$, $s_1/c_1$, $s_0/c_0$ to the respective outgoing 64-bit sum/carry pairs $sx_3/cx_3$, $sx_2/cx_2$, $sx_1/cx_1$, $sx_0/cx_0$. However, the incoming sum/carry pairs occupy different bit positions in the output sum/carry pairs. The mapping occurs in the following manner. The significance of this mapping will become clear in the discussion of the instruction set.

$s_3[31:0]$, $c_3[31:0]$ ⇒ $sx_3[63:48]$, $cx_3[63:48]$    $s_1[31:0]$, $c_1[31:0]$ ⇒
$sx_1[47:16]$, $cx_1[47:16]$
$s_2[31:0]$, $c_2[31:0]$ ⇒ $sx_2[47:16]$, $cx_2[47:16]$    $s_0[31:0]$, $c_0[31:0]$ ⇒
$sx_0[31:0]$, $cx_0[31:0]$

Preferably, circuit 156 comprises a set of wires which simply route the incoming sum/carry lines to the appropriate bit positions in the output lines. As in the case of circuit 154 above, the uppermost sign bit of each of the incoming lines is simply ignored, as it is an extraneous bit in stages 2 and 3 of the multiplication unit 100.

Stage 2 includes selector circuit 114. Outputs 153 of circuit 152 feed into the 'a' inputs of selector circuit 114. Similarly, outputs 155 of circuit 154 are coupled to the 'b' inputs of selector circuit 114. The selector circuit outputs either the 'a' inputs or the 'b' inputs to its output lines 115. The output 115 feeds into the 'a' inputs of another selector circuit 116.

The eight outputs, $sx_n/cx_n$, of circuit 156 feed into an 8:2 compression circuit 140. The compression circuit produces a pair of 64-bit sum/carry outputs 141. These outputs feed into the 'b' inputs of selector circuit 116. The selector circuit selects either its 'a' or its 'b' input lines and provides the selected lines to the inputs of a 3:2 compression circuit 160.

It can be seen that, alternatively, outputs 153 and 155 could be tied directly into selector circuit 116. The configuration shown in FIG. 1, however, is preferred because the presence of selector 114 synchronizes the timing of the data flow with the data flow through compressor 140. Effectively, selectors 114 and 116 cooperate to act as a single 3:1 selector to select data from one of the three data transformation paths.

Yet another selector circuit 112 receives input line src3 in its 'a' input. Its 'b' input is coupled to a constant value "0.5." Its 'c' input is coupled to a constant value "0." The selected input of selector 112 is coupled to a third input of compression circuit 160. Compression circuit 160 combines its three inputs and produces two 64-bit outputs 161. These outputs are coupled to pipeline latch P3, separating stage 2 from stage 3.

In stage 3, the outputs 163 of pipeline latch P3 are comprised of the sum and carry lines from stage 2. The sum and carry lines feed into a carry-propagate adder circuit 170. The output of adder circuit 170 is 64 bits. The top half, bits [63:32], feed into the 'a' input of selector circuit 118. The bottom half, bits [31:0], feed into the 'b' input of selector circuit 119. A saturation value generator 182 feeds into the 'a' inputs of selector circuits 118 and 119.

The outputs 163 of pipeline latch P3 also feed into overflow detection logic circuits 180, 186. The low-order bits [31:0] of output 163 feed into detection logic 180. The high-order bits [63:32] feed into detection logic 186. The outputs of each circuit 180, 186 feed into selector inputs of respective selector circuits 118 and 119.

Figure 2:
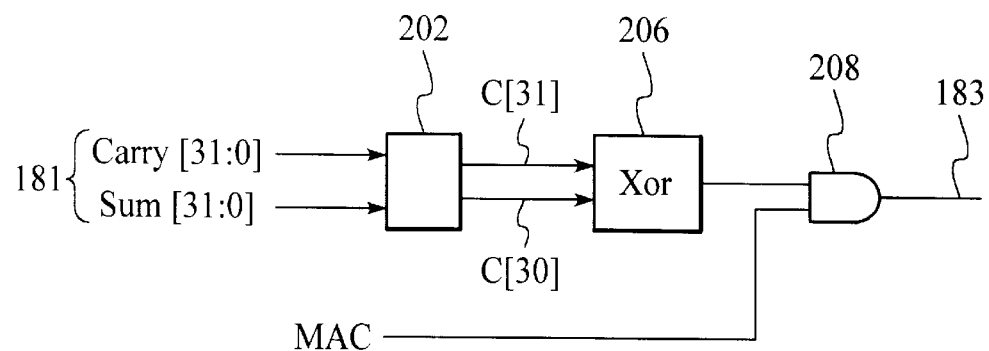
FIG. 2 illustrates additional detail of the overflow detection logic shown in FIG. 1.

Detection logic 180 and 186 predict, based on its inputs, whether an overflow will occur for the addition operation that takes place in adder circuit 170. FIG. 2 shows additional detail for circuit 180. The low-order bits of each of the sum and carry inputs 181 namely, bits [31:0], feed into a carry generation circuit 202. This circuit is simply the carry generation logic of an adder circuit. The output of circuit 202 is a 32-bit carry. The upper two bits c[31] and c[30] are XOR'd by XOR gate 206. The output of gate 206 is AND'd with control signal MAC. The MAC control signal is asserted when either the MMACFX.WL or MACNFX.WL instructions are decoded for execution. The MAC control signal is de-asserted otherwise. Circuit 180 asserts output 183 when overflow is predicted to occur. Detection logic 186 is similarly configured and operates in the same manner. Output 187 will be asserted when overflow is going to occur based on the upper 32 bits of the sum and carry lines 163.

Returning to FIG. 1, if an overflow condition is predicted by logic 180, then selector circuit 118 will produce the 'a' input at its output 188. Otherwise, selector circuit 118 will produce the 'b' input at its output. As can be seen, output 188 comprises the upper 32 bits of output 190, which comprises the output of multiplication unit 100. Similarly, if an overflow condition is predicted by logic 186, then selector circuit 119 will produce the 'a' input at its output 189. Otherwise, selector circuit 119 will produce the 'b' input at its output. The output 189 comprises the lower 32 bits of output 190.

Figure 3:
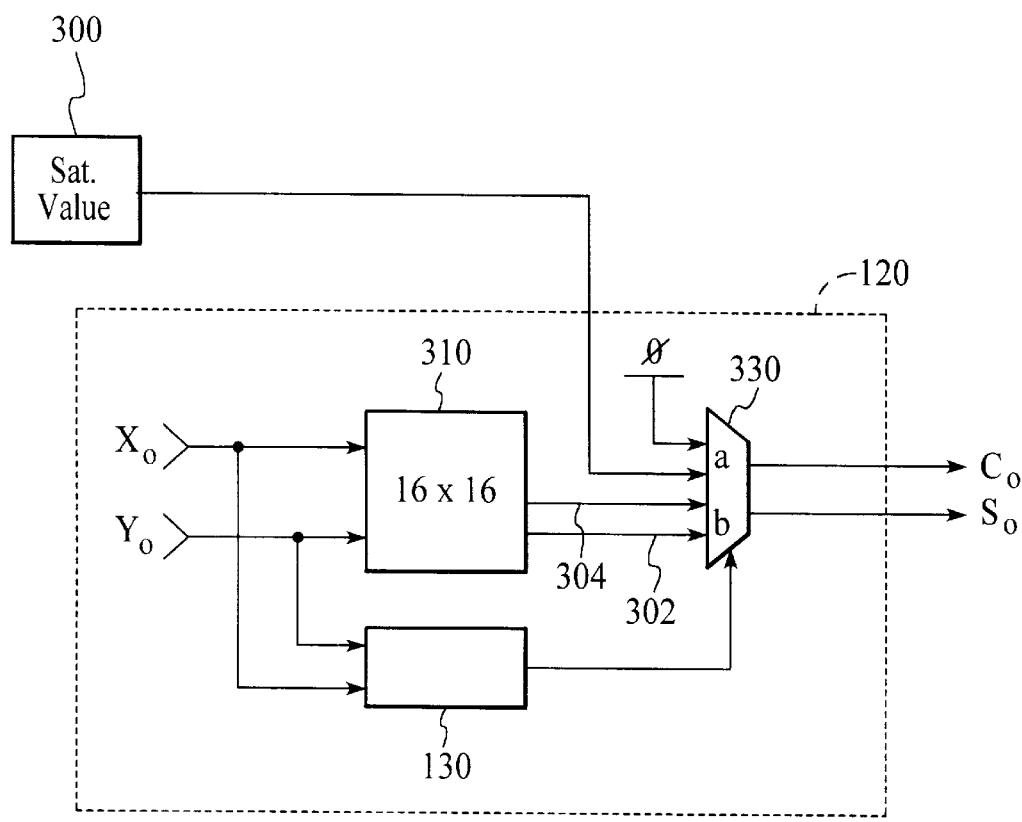
FIG. 3 shows additional detail of the multiplier circuits shown in the multiplication unit of FIG. 1.

Referring now to FIG. 3, additional detail of multiplier circuits 120–126 is shown by the exemplary illustration for multiplier 120. It is understood that circuits 122–126 are configured similarly. Circuit 120 includes a Wallace adder tree 310 to provide 16×16 bit multiplication. The 16-bit input lines $x_0$ and $y_0$ from selector circuit 110 are combined by the Wallace adder tree. The output is a 33-bit carry line 304 and a 33-bit sum line 302. The $33^{rd}$ bit on each of the sum and carry lines is a sign bit. The sum and carry lines are coupled to the 'b' inputs of a selector circuit 330. Normally, selector circuit 330 will select the 'b' inputs as the $c_0$ and $s_0$ outputs of multiplier circuit 120.

In accordance with the invention, each multiplier circuit 120–126 includes overflow detection logic 130. The 16-bit input lines $x_0$ and $y_0$ coupled to Wallace tree 310 also couple to detection logic 130. The detection logic has an output coupled to the 'a' input of selector circuit 330. A saturation value generator 300 has an output also coupled to the 'a' input of selector circuit 330. The detection logic predicts, based on $x_0$ and $y_0$, whether an overflow will occur for 16-bit fixed point multiplications. If an overflow condition is predicted, then selector circuit 330 will select the 'a' inputs as the $c_0$ and $s_0$ outputs of multiplier circuit 120. In accordance with the invention, the detection logic in stage 1 detects whether both $x_0$ and $y_0$ are −1. This is an overflow condition for fixed-point multiplication since the maximum positive value using fixed-point notation is $1-2^{-15}$ for 16-bit data and $1-2^{-32}$ for 32-bit data.

Figure 4:
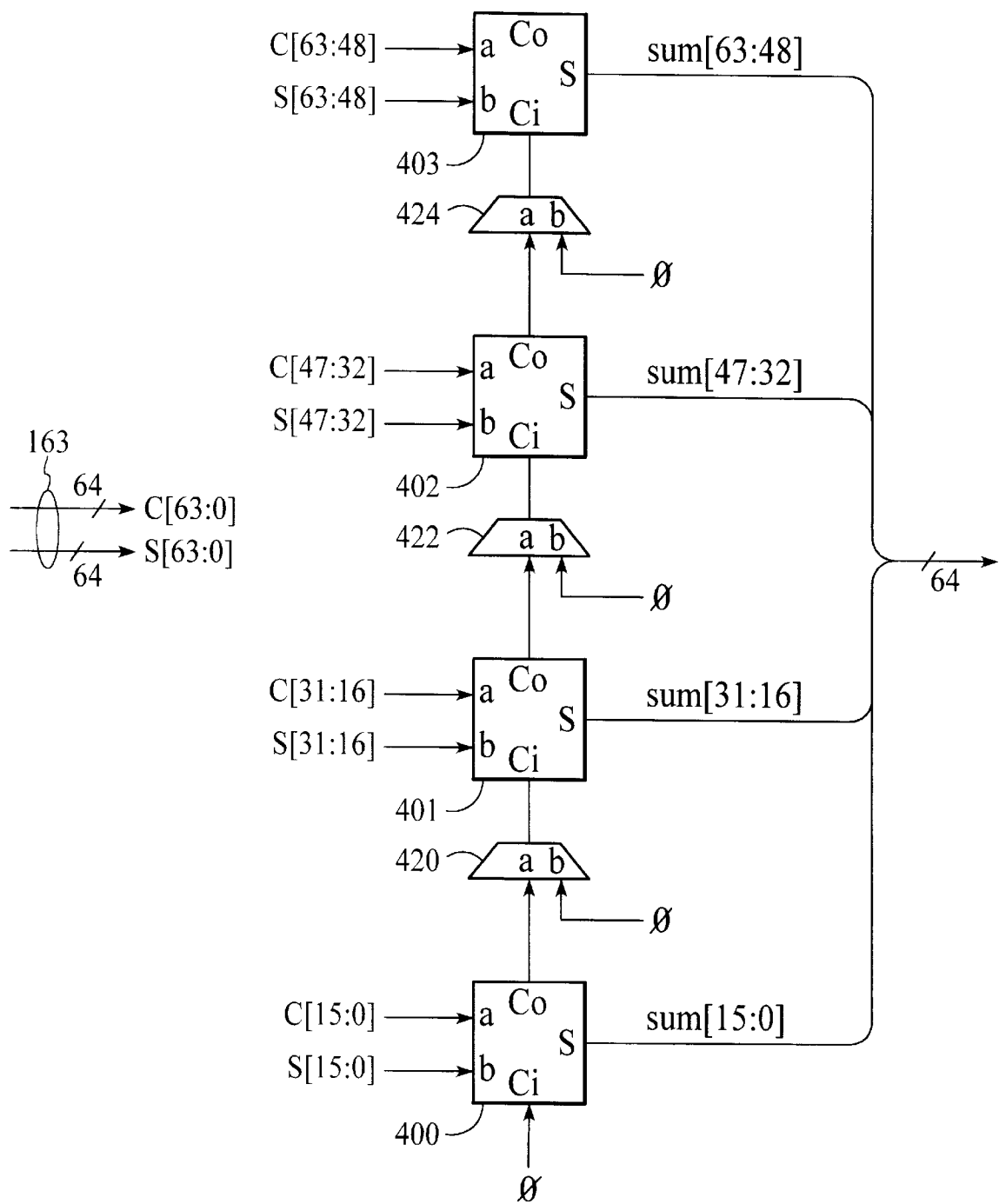
FIG. 4 is a schematic illustration of the adder circuit shown in FIG. 1.

Referring to FIG. 4, adder circuit 170 of stage 3 comprises four adder stages. The incoming 64-bit sum and carry lines 163 are grouped into four sets of 16-bit lines. Each adder stage includes a full adder circuit 400–403. The low-order 16-bit sum/carry line group, s[5:0], c[15:0], is coupled to the inputs of full adder 400, the next 16-bit sum/carry line group, s[31:16], c[31:16], is coupled to the inputs of full adder 401, the sum/carry line group s[47:32], c[47:32] is coupled to the inputs of full adder 402, and the high-order 16-bit sum/carry line group is coupled to full adder 403.

The full adders are coupled together through selector circuits 420–424 to provide a selectable ripple-carry configuration. The carry-out of adder 400 is coupled to the 'a' input of selector circuit 420. The output of selector circuit 420 is coupled to the carry-in of adder 401. In turn, the carry-out of adder 401 feeds into the 'a' input of selector circuit 422, the output of which is coupled to the carry-in of adder 402. The carry-out of adder 402 is coupled to the 'a' input of selector circuit 424. The output of selector circuit 424 feeds into the carry-in of adder 403. The 'b' inputs of selector circuits 420–424 are coupled to constant value "0." The carry-in of adder 400 also is coupled to constant value "0." The 16-bit outputs of the adder circuits are combined to produce the 64-bit output of adder 170. As explained above the output of adder 170 then feeds into selector circuits 118 and 119.

Figure 5:
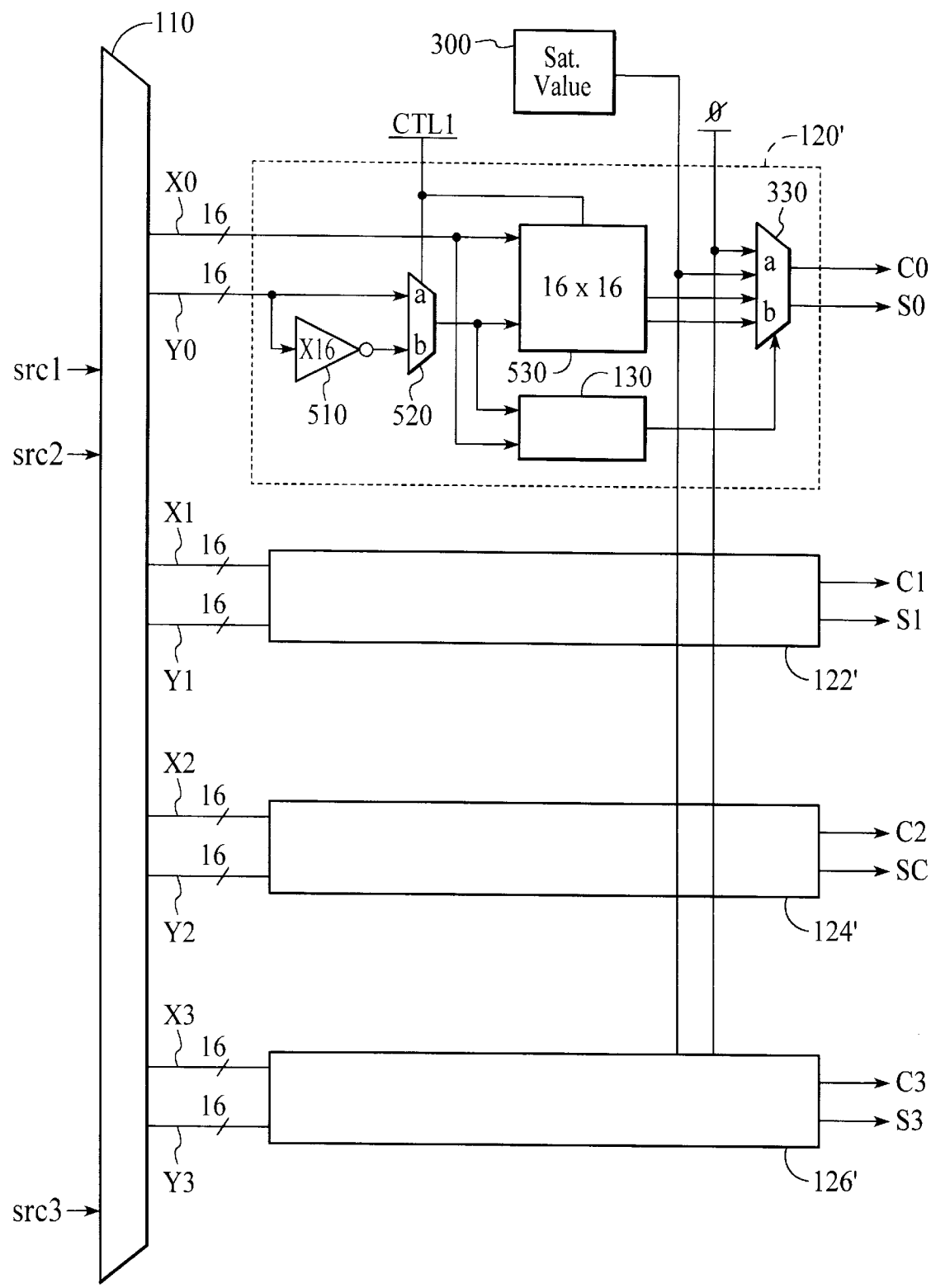
FIG. 5 is an alternate embodiment of the multiplier circuits shown in the multiplication unit of FIG. 1 in connection with certain multimedia instructions of the invention.

In another embodiment of the invention, multiplier circuits 120–126 of stage 1 in FIG. 1 have an alternate configuration. FIG. 5 is an exemplary illustration of alternate multiplier circuits 120'–126' shown substituting circuit 120–126. The configuration shown in FIG. 5 is used for implementing certain instructions which will be discussed below.

The additional detail of multiplier 120' shows a modified 16×16 Wallace tree adder 530. Output line $x_0$ of selector circuit 110 is one input to the Wallace tree adder. The other input to the Wallace tree comes from a selector circuit 520. The 'a' input of selector circuit 520 is coupled to output line $y_0$ of selector circuit 110. Output line $y_0$ is inverted to produce a 1's complement output, which is coupled to the 'b' input of selector circuit 520. The inversion logic 510 can be provided by sixteen inverters. Selector circuit 520 and the modified Wallace tree receive control signals CTL1.

Control signals CTL1 are produced in response to decoding the MMACNFX.WL instruction. When CTL1 is asserted, selector circuit 520 produces the 'b' inputs which feed the 1's complement of $y_0$ into the modified Wallace tree. Moreover, the Wallace tree is modified so that when CTL1 is asserted, a constant value "1" is added to the product of its inputs. In effect, this is the same as inverting $y_0$ and then adding a "1." This operation produces the two's complement of $y_0$. Thus, asserting CTL1 results in multiplication of $x_0$ by $-y_0$.

As in the configuration shown in FIG. 3, the Wallace tree inputs also feed into overflow detection logic 130. As discussed in connection with FIG. 3, saturation value generator 300 produces an output that is coupled to the 'a' input of selector circuit 330. When detection logic 130 determines that overflow will occur, selector circuit 330 will produce the saturation value from its 'a' inputs.

Figure 6:
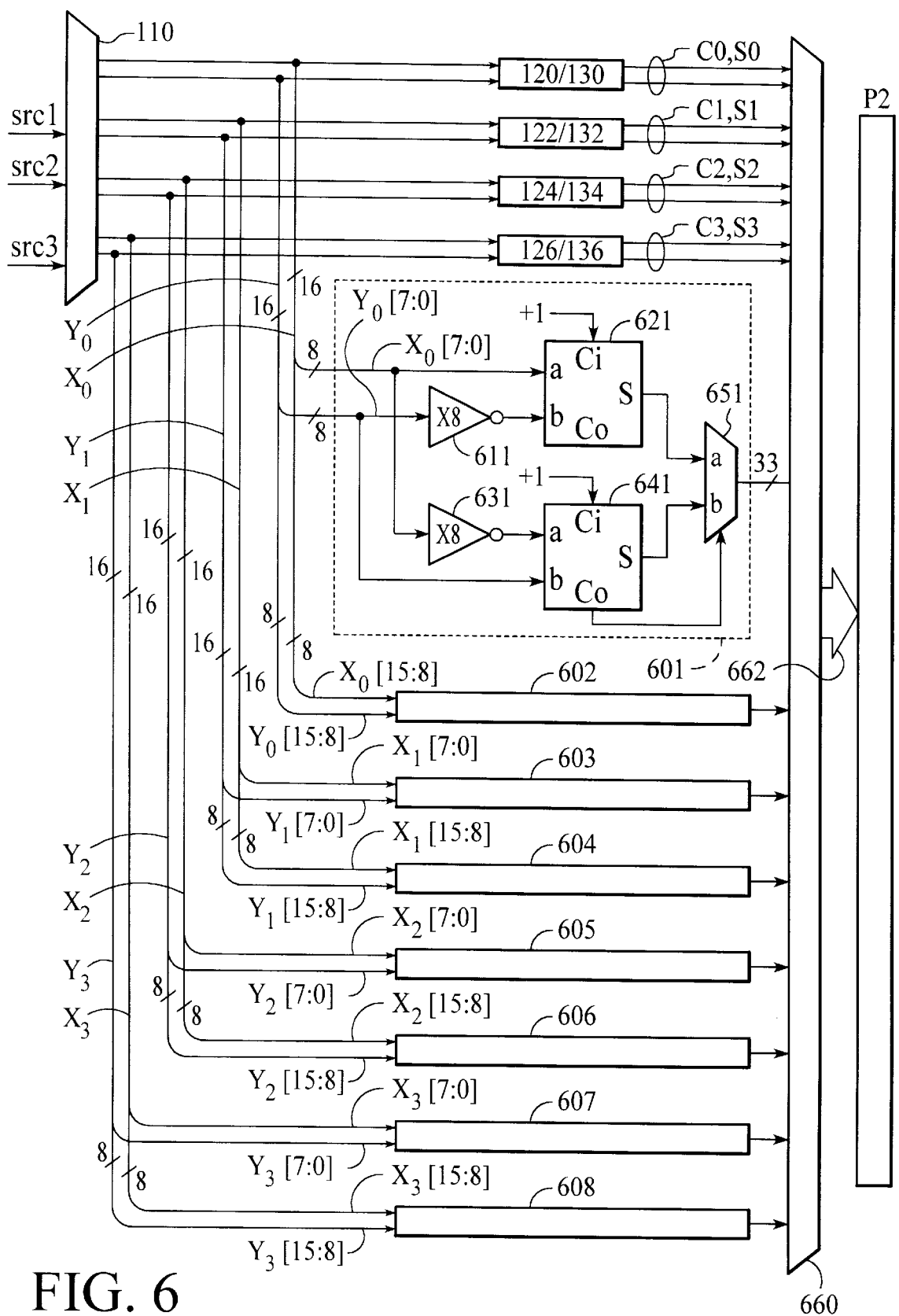
FIG. 6 illustrate additional logic for the multiplication unit of FIG. 1 in connection with certain multimedia instructions of the invention.

Refer now to FIG. 6 for yet another embodiment of the invention. Shown is additional logic which resides in stage 1 of the multiply unit 100. In addition to the multiplier circuits 120–126, are subtraction units 601–608. Additional detail is provided with reference to subtraction unit 601. The subtraction unit 601 receives two 8-bit inputs, $x_0$ and $y_0$. The $x_0$ input feeds into a full adder 621 and an inverter bank 611 of eight inverters. The output of inverter bank 611 feeds into a second full adder 641. The $y_0$ input is coupled to the second input of full adder 641 and to another bank of eight inverters 631. The outputs of inverters 631 are coupled to the second input of full adder 621. The carry-in's of both full adders are coupled to a constant value "1." The output of full adder 621 is coupled to the 'a' input of selector circuit 651, while the 'b' input of the selector circuit receives the output of full adder 641.

With respect to full adder 621, the combined effect of inverting $y_0$ and supplying a "1" to the carry-in is the production of the 2's complement of $y_0$, thus producing $-y_0$. Full adder 621, therefore, computes the quantity $(x_0-y_0)$. Similarly with respect to full adder 641, the combined effect of inverting $x_0$ and supplying a "1" to the carry-in is to create the 2's complement of $x_0$. Full adder 641, therefore, computes the quantity $(-x_0+y_0)$.

The selector circuit's select input is coupled to one of the carry-out's of the full adders; the other carry-out being ignored. By connecting the appropriate carry-out of one of the full adders to the selector of selector circuit 651, the effect is to produce at the output of subtraction unit 601 the absolute value of $(x_0-y_0)$.

FIG. 6 shows eight subtraction units 601–608. Each unit operates on 8-bit groupings of the outputs $x_3/y_3$, $x_2/y_2$, $x_1/y_1$, and $x_0/y_0$ of selector circuit 110. For example, subtraction unit 601 operates on the 8-bit set $x_0[7:0]$ and $y_0[7:0]$. Subtraction unit 602 operates on the 8-bit set $x_0[15:8]$ and $y_0[15:8]$, and so on.

A selector circuit 660 receives the sum and carry outputs of the multiplier circuits 120–126. Selector circuit 660 also receives the outputs of the subtraction units. The output of selector circuit 660 therefore presents to pipeline latch P2 either the eight sum/carry lines $s_3/c_3$, $s_2/c_2$, $s_1/c_1$, $s_0/c_0$, or the eight outputs of subtraction units 601–608. Note that the outputs of the substraction units are 8-bit results. However, the sum/carry lines are 33 bits each. Therefore, the 8-bit results of the subtraction units are zero-extended to fit into 33 bits before being latched into the pipeline latch P2.

Another aspect of the invention lies in improvements in the area of instructions relating to various transpose operations of vectored data. Shuffle logic 700 provided in accordance with the invention is schematically illustrated by the circuitry shown in FIG. 7. A pair of general purpose registers are accessed from register file 102 and fed into the 64-bit src1 and src2 input lines. The input lines are coupled into a bit shifting circuit 702. As will be discussed further, bit shifter 702 provides bit-level shifting of src1. Moreover, bit shifter 702 provides left- and right-direction shifting and shifting of one to seven bit positions in either of those directions. Bit shifter 702 includes a left/right control input 752 to select left or right shifting. Another control input 754 is a 3-bit shift input specifying the shift amount. The shift amount is contained in src2 which feeds into shift input 754.

The two 64-bit outputs of bit shifter 702 represent src1 and src2 after being left or right shifted by anywhere between 0–7 bit positions. The outputs couple into a matrix 704. A control input 756, derived from src2, feeds into matrix 704. The matrix 704 can select any 64 of its 128 (2×64) input bitlines and produce them, in any order, at its 64 output bitlines. Each of the 64 output bitlines feeds into the 'a' input of a selector circuit 740.

Some of the source lines src1 also feed into a sign generator 708. The 64 output bitlines of the sign generator each feed into the 'b' inputs of the selector circuits 740. A mask generator 710 receives the shift amount in src2. The mask generator produces outputs which operate selector circuits 740. The significance of sign generator 708 and mask generator 710 will be discussed below in connection with the instruction set.

The outputs of selector circuits 740 are latched into latches 712. The latch 712 also receives the outputs of the bit shifter 702. The latch serves to synchronize the arrival of data from the bit shifter 702 and the matrix 704. The outputs of selectors 740 couple to the 'a' inputs of selector circuit 724 and the an input of an overflow detection circuit 720. The outputs of bit shifter 702 also feed into overflow detection circuit 720. A saturation value generation circuit 722 provides an input to detection circuit 720 and feeds into the 'b' input of selector circuit 724. Selector circuit 724 produces either its 'a' input or its 'b' input in response to an output of detection circuit 720.

Figure 8:
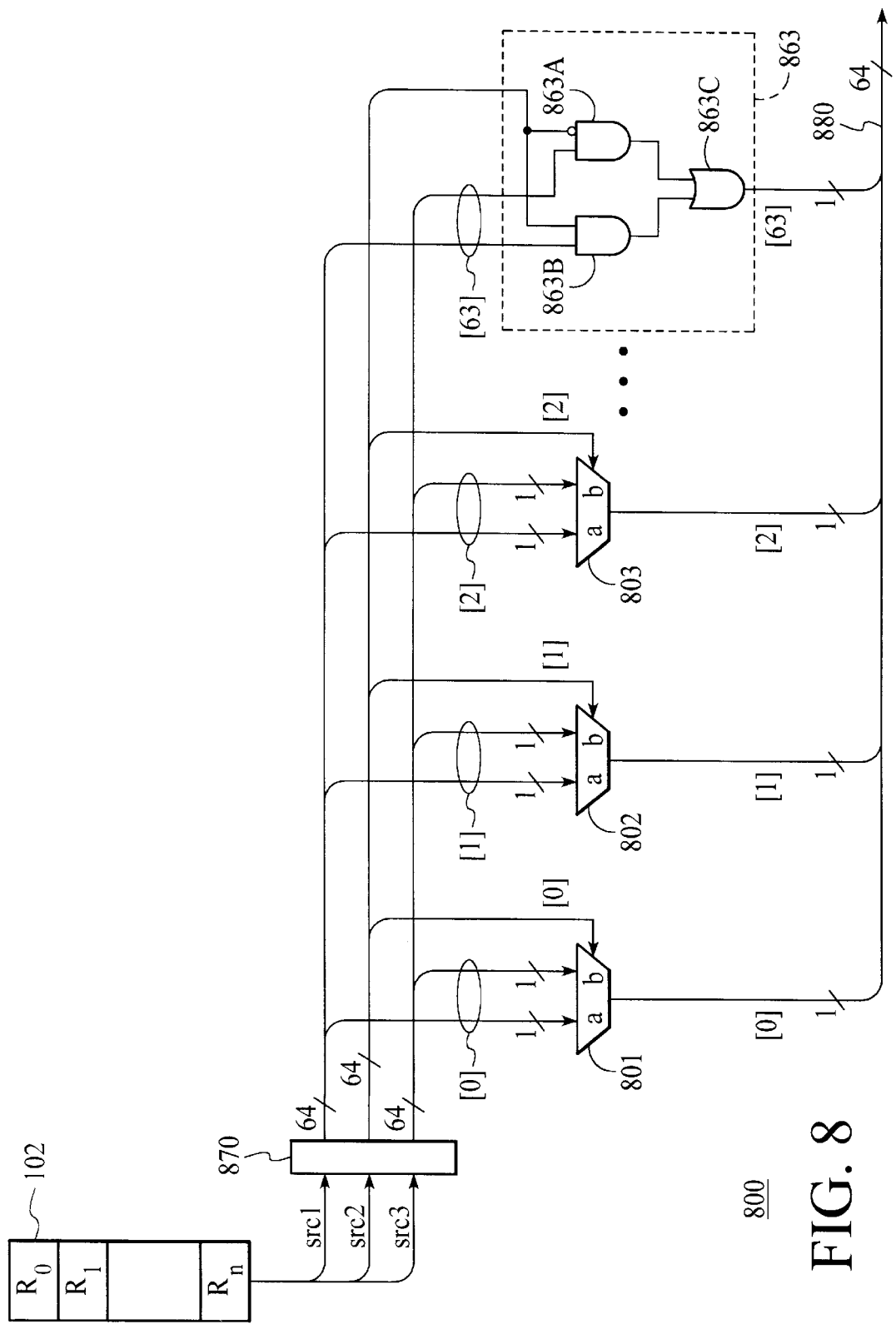
FIG. 8 is a bit manipulation circuit in connection with certain multimedia instructions of the invention.

Referring now to FIG. 8, additional logic 800 for transpose operations in accordance with the invention includes a latch 870 for latching in three sources, src1, src2, and src3, from general purpose register file 102. Each of the 64 bitlines of each of src1 and src3 respectively feed into the single-bit 'a' and 'b' inputs of selector circuits 801–863. Selector circuit 863 is an exemplary illustration of a typical design of such a 2:1 selector circuit. The selector controls of the selector circuits are supplied by the 64 bitlines of src2. The selector circuit outputs are combined to produce a 64-bit output 880.

Having described the circuitry of the invention, the discussion will now turn to the operation of the foregoing circuits in connection with the instruction set. The following notational convention is used to represent the various data formats supported by the instructions. Source registers are designated by Rm and Rn, and the destination register is designated by Rd. The data size is 64 bits, and the data ordering convention places the lower order data in the lower numbered positions.

bit-level operation
    Rx: $Rx_{63}$, $Rx_{62}$, ... $Rx_1$, $Rx_0$, x=1, 2, 3 byte-level (8 bits) operation
    Rx: $Rx_{b7}$, $Rx_{b6}$, $Rx_{b5}$, $Rx_{b4}$, $Rx_{b3}$, $Rx_{b2}$, $Rx_{b1}$, $Rx_{b0}$, X=1, 2, 3 word-level (16 bits) operation
    Rx: $Rx_{w3}$, $Rx_{w2}$, $Rx_{w1}$, $Rx_0$, x=1, 2, 3 long word (32 bits) operation
    Rx: $Rx_{L1}$, $Rx_{L0}$, x=1, 2, 3

Each of the instructions has the following assembly-level instruction format:
    OP-CODE (6 bits):Rin (6 bits):OP-EXT (4 bits):Rn (6 bits):Rd (6 bits)

The OP-EXT field is used for instructions which are identical in function but differ by an a numeric value; e.g., MEXTR*. Each assembly-level instruction is translated to a corresponding machine-level instruction, comprising a series of ones and zeroes. The machine-level instruction is decoded to produce various control signals which operate the various logic to effectuate execution of the decoded instruction.

Depending on the instruction, the operand(s) may contain packed (vectored) data. This is a known convention wherein two or more N-bit, independent data elements are contained in one operand. Each datum is N bits in size. The operation performed on each of the data is executed independently of the other, though it is the same operation.

MMUL.W

This is a packed (vectored) 16-bit multiply instruction. Each of the two operands Rm, Rn contains four independent 16-bit words. The result Rd comprises four 16-bit values.
    RM: $Rm_{w3}$, $Rm_{w2}$, $Rm_{w1}$, $Rm_{w0}$
    Rn: $Rn_{w3}$, $Rn_{w2}$, $Rn_{w1}$, $Rn_{w0}$
    Rd: $Rm_{w3} \times Rn_{w3}$, $Rm_{w2} \times Rn_{w2}$, $Rm_{w1} \times Rn_{w1}$, $Rm_{w0} \times Rn_{w0}$ The 16-bit×16-bit multiplication results in a 32-bit quantity. Consequently, for the purposes of this instruction, the result of each multiplication is down-converted to 16 bit format using modulo arithmetic.

With respect to FIG. 1, decoding of this instruction will produce appropriate control signals (not shown) to output the contents of Rm to the src1 data lines and the contents of Rn to the src2 data lines. The data is latched into pipeline latch P1 and clocked into selector circuit 110. Selector circuit 110 is controlled to provide the following output of x and y lines:

$x_3$–src1[63–48]($Rm_{w3}$), $x_2$–src1[47–32]($Rm_{w2}$), $x_1$–src1[31–16]($Rm_{w1}$), $x_0$–scr1[15–0]($Rn_{w0}$)

$y_3$–src2[63–48]($Rn_{w3}$), $y_2$–src2[47–32]($Rn_{w2}$), $y_1$–src2[31–16]($Rn_{w1}$), $y_0$–src2[15–0]($Rn_{w0}$) The x and y lines feed into their respective multiplier circuits 120–126. Sum/carry outputs $s_3/c_3, s_2/c_2, s_1/c_1, s_0/c_0$, are produced at the outputs of multipliers 120–126 and latched into P2.

Each sum/carry pair (e.g., $s_0/c_0$) contains the respective 16×16 product of operands Rm and Rn (e.g., $Rm_{w0} \times Rn_{w0}$). For the purposes of the MMUL.W instruction, only the path through circuit 152 is relevant, though the sum/carry pairs in stage 2 feed into transpose circuits 152, 154, and 156. The upper seventeen bits of each of the pairs of sum/carry lines are masked out leaving the lower sixteen bits, recalling that the sum/carry pairs are 33-bit lines. This masking out step is referred to as a down-conversion of 32-bit the results into 16-bit quantities via modulo arithmetic. In addition, circuit 152 packs the four pairs of 16-bit results into the 64-bit carry and sum lines 153.

Lines 153 feed through selector circuit 114 and selector circuit 116 into compression circuit 160. Selector circuit 112 is operated to produce the "0" constant (input 'c'), thus feeding a "0" into compression circuit 160. Inputting a "0" to compression circuit 160 has the effect of passing its inputs 117 directly to its outputs 161. The compression circuit is thus effectively bypassed and behaves like a pass-through device, feeding its inputs 117 directly to P3 without compression.

With respect to FIGS. 1 and 4, the outputs 163 from the P3 latches feed into adder circuit 170. Selector circuits 420–424 are controlled to produce their respective 'b' inputs at the selector circuit outputs. Thus, constant "0" is passed into the carry-in of each of the full adders 400–403. Doing this configures the full adders as four independent full adder units, thus providing four independent addition operations on its inputs. Moreover, the four independent addition operations are executed simultaneously, since each circuit is a self-contained full-adder. This is precisely the effect desired for the MMUL.W instruction. Since the four packed words are independent values, the result should be four independent product terms. Moreover, the four independent addition operations are executed simultaneously, since each circuit is a self-contained full-adder. For MMUL.W, the detection logic 180 and 186 shown in FIG. 1 is not used. Selector circuits 118 and 119 therefore produce their 'b' inputs in response to control signals produced during by the decoding of MMUL.W, thereby forming the 64-bit result.

MMULFX.W
MULFXRP.W

These are packed (vectored) 16-bit, fixed-point multiply instructions. Each of the two operands Rm, Rn contains four independent 16-bit words. The result Rd comprises four 16-bit values. The MMULFXRP.W instruction includes rounding.

RM: $RM_{w3}, RM_{w2}, Rm_{w1}, Rm_{w0}$

Rn: $Rn_{w3}, Rn_{w2}, Rn_{w1}, Rn_{w0}$

Rd: $Rm_{w3 \times Rnw3}, Rm_{w2} \times Rn_{w2}, Rm_{w1} \times Rn_{w1}, Rm_{w0} \times Rn_{w0}$ These instructions are processed in the same manner as discussed above for MMUL.W with the following differences to account for the fixed-point format of the operands of MMULFX.W and MMULFXRP.W:

Since a 16-bit×16-bit multiplication results in a 32-bit quantity, the result of the fix-point multiplication is down converted to 16 bits with saturation. The down-conversion involves retaining only the most significant 16 bits of the 32-bit result. Saturation is a known process. When the result of an arithmetic operation requires more bits than a given data type can hold, the result is clamped to the maximum or minimum number that can be represented by that data type. For example, if the result must fit into a 16-bit signed integer but the result is a 20-bit value, saturation of the result would produce a value of $2^{15}-1$ (maximum value for 16-bit signed integer) or $-2^{-15}$ (minimum value for 16-bit signed integer), depending on the sign of the result. In the case of 16-bit fixed-point values, the range is $-1$ to $(1-2^{-15})$.

Thus, for these fixed-point multiplies, overflow detection is performed in the multiply circuits 120–126 of stage 1. As discussed in connection with FIG. 3, detection logic 130 determines when both of its inputs are $-1$. When that occurs, selector circuit 330 produces its 'a' inputs. Since saturation generator outputs $(1-2^{-15})$ for MMULFX.W and MMULFXRP.W, the sum and carry lines, $s_0$ and $c_0$, will respectively be set to "0" and $(1-2^{-15})$, or vice-versa. This also happens for the other sum and carry lines $s_3/c_3, s_2/c_2,$ and $s_1/c_1$. In this manner, the overflow condition is detected and handled for each of the four product terms.

In stage 2, the $s_3/c_3, s_2/c_2, s_1/c_1,$ and $s_0/c_0$ lines are packed into 64-bit lines 153 by transpose circuit 152. For the purposes of the MMULFX.W and MMULFXRP.W instructions, only the path through circuit 152 is relevant, though the sum/carry pairs in stage 2 feed into transpose circuits 152, 154, and 156. The lines 153 are then coupled into compression circuit 160 via selector circuits 114 and 116. For MMULFX.W, the circuit 112 feeds constant "0" into the compression circuit. Consequently, there is no compression of the input for the MMULFX.W instruction. For fixed point operations, the result is left-shifted by 1 in order to maintain the fixed point representation of the result. The output of compression circuit is latched to P3.

As for the MMULFXRP.W instruction, rounding occurs in stage 2. Selector circuit 112 produces the "0.5" constant. Since the instruction operates on 16-bit data, selector 112 produces four copies of "0.5" in fixed point format and packs them into its 64-bit output 113. Each constant is combined in compression circuit 160 with its corresponding sum and carry lines $s_3/c_3, s_2/c_2, s_1/c_1,$ and $s_0/c_0$ from circuit 152. This produces the rounding operation for MMULFXRP.W. Processing then passes on and continues in stage 3.

With respect to FIGS. 1 and 4, the outputs 163 from the P3 latches feed into adder circuit 170. Selector circuits 420–424 are controlled to produce their respective 'b' inputs at the selector circuit outputs. Thus, constant "0" is passed into the carry-in of each of the full adders 400–403. The full adders, therefore, are configured as four separate adder units, each providing an add operation on its inputs independently of the other inputs. This is precisely the effect desired for the MMULFX.W and MMULFXRP.W instructions. Since the four packed words are independent values, the result should be four independent products terms.

MMUL.L

This is a packed (vectored) 32-bit multiply instruction. Each of the two operands Rm, Rn contains two independent 32-bit words. The result Rd comprises two 32-bit values.

Rm: $RM_{L1}, Rm_{L0}$

Rn: $Rn_{L1}, Rn_{L0}$

Rd: $Rm_{L1} \times Rn_{L1}, Rm_{L0 \times RnL0}$

The 32×32 multiplication results in a 64-bit quantity. Consequently, for the purposes of this instruction, the result of each multiplication is down-converted to 32-bit format using modulo arithmetic.

In accordance with the invention, 32-bit multiplication is performed by splitting each 32-bit operand into two 16-bit elements. The multiplication can then proceed as independent 16-bit operations and the intermediate results combined to produce a 64-bit result. This allows re-use of the existing 16-bit multipliers 120–126 shown in FIG. 1 to provide 32-bit multiplication.

A 32-bit number, A, has the form:

$$A_h \times 2^{16} + A_l,$$

where $A_h$ is the uppermost word of A, A[31:16]
$A_l$ is the low word of A, A[15:0].
Thus, A×B can be represented as:

$$(A_h \times 2^{16} + A_l) \times (B_h \times 2^{16} + B_l) \qquad \text{Eqn. 1}$$

$$= A_h \times 2^{16} \times B_h \times 2^{16} + A_h \times 2^{16} \times B_l + B_h \times 2^{16} \times A_l + A_l \times B_l \qquad \text{Eqn. 2}$$

$$= A_h \times B_h \times 2^{32} + (A_h \times B_l + B_h \times A_l) \times 2^{16} + A_l \times B_l \qquad \text{Eqn. 3}$$

Borrowing from algebra, the foregoing can be viewed as a polynomial expansion of a product of two binomials. The first binomial term is ($A_h \times 2^{16} + A_l$) and the second binomial term is ($B_h \times 2^{16} + B_l$). The polynomial expansion is represented by Eqn 3.

With respect to FIG. 1, decoding of the MMUL.L instruction will produce appropriate control signals (not shown) to output the contents of Rm to the src1 data lines and the contents of Rn to the src2 data lines. The data is latched into pipeline latch P1 and is clocked into selector circuit 110 during a first cycle of instruction execution. The control signals corresponding to MMUL.L operate selector circuit 110 to map the src1 and src2 data lines to the x and y lines in the following manner:

| 32-bit mapping | 32-bit mapping (alt) | register content (alt) |
|---|---|---|
| src1[31:16] ⇒ $x_3$ | | $Rm_{h0}$ |
| src1[31:16] ⇒ $x_2$ | src1[15:0] ⇒ $x_2$ | $Rm_{h0}$ ($Rm_{10}$) |
| src1[15:0] ⇒ $x_1$ | src1[31:16] ⇒ $x_1$ | $Rm_{10}$ ($Rm_{h0}$) |
| src1[15:0] ⇒ $x_0$ | | $Rm_{10}$ |
| src2[31:16] ⇒ $y_3$ | | $Rn_{h0}$ |
| src2[15:0] ⇒ $y_2$ | src2[31:16] ⇒ $y_2$ | $Rn_{10}$ ($Rn_{h0}$) |
| src2[31:16] ⇒ $y_1$ | src2[15:0] ⇒ $y_1$ | $Rn_{h0}$ ($Rn_{10}$) |
| src2[15:0] ⇒ $y_0$ | | $Rn_{10}$ |

The "alternative" mapping recognizes the commutative property of the addition operation for the term ($A_h \times B_l + B_h \times A_l$) in Eqn. 3.

Notice that in the first pipeline execution cycle, only the low order longword from each of src1 and src2 is selected and provided to the multiplier circuits in stage 1. The low order longword reference is indicated by the "0" subscript designation in the register names (e.g., $Rm_{h0}$). During the second cycle of pipeline execution, when the sum/carry outputs from the first cycle proceed into stage 2, the high order longwords of src1 and src2 are selected and provided to multiplier circuit 120–126. Consequently, the MMUL.L instruction requires an extra cycle to complete. Thus, during the second cycle, the following data selection occurs in stage 1:

| 32-bit mapping | 32-bit mapping (alt) | register content (alt) |
|---|---|---|
| src1[63:48] ⇒ $x_3$ | | $Rm_{h1}$ |
| src1[63:48] ⇒ $x_2$ | src1[47:32] ⇒ $x_2$ | $Rm_{h1}$ ($Rm_{11}$) |
| src1[47:32] ⇒ $x_1$ | src1[63:48] ⇒ $x_1$ | $Rm_{11}$ ($Rm_{h1}$) |
| src1[47:32] ⇒ $x_0$ | | $Rm_{11}$ |
| src2[63:48] ⇒ $y_3$ | | $Rn_{h1}$ |
| src2[47:32] ⇒ $y_2$ | src2[63:48] ⇒ $y_2$ | $Rn_{11}$ ($Rn_{h1}$) |
| src2[63:48] ⇒ $y_1$ | src2[47:32] ⇒ $y_1$ | $Rn_{h1}$ ($Rn_{11}$) |
| src2[47:32] ⇒ $y_0$ | | $Rn_{11}$ |

Continuing then, the x and y lines feed into their respective multiplier circuits 120–126. Sum/carry outputs $s_3/c_3$, $s_2/c_2$, $s_1/c_1$, $s_0/c_0$, are produced in the manner discussed in connection with FIG. 3.

The outputs of multipliers 120–126 are latched into P2. The sum/carry lines entering stage 2 represent the following product terms:

$s_3/c_3 = A_h \times B_h$, $s_2/c_2 = A_h \times B_l$, $s_1/c_1 = B_h \times A_l$, $s_0/c_0 = A_l \times B_l$, However, Eqn. 3 requires that some of the above terms be multiplied by powers of 2. This is provided by transpose circuit 156. For the purposes of the MMUL.L instruction, only the path through circuit 156 is relevant, though the sum/carry pairs in stage 2 feed into transpose circuits 152, 154, and 156.

As previously explained, incoming sum/carry pairs $s_3/c_3$, $s_2/c_2$, $s_1/c_1$, $s_0/c_0$ are mapped to their respective outgoing 64-bit sum/carry pairs $sx_3/cx_3$, $sx_2/cx_2$, $sx_1/cx_1$, $sx_0/cx_0$ in the following manner:

| | |
|---|---|
| $s_3[31:0]$, $c_3[31:0] \Rightarrow sx_3[63:48]$, $cx_3[63:48]$ | (× $2^{32}$) |
| $s_2[31:0]$, $c_2[31:0] \Rightarrow sx_2[47:16]$, $cx_2[47:16]$ | (× $2^{16}$) |
| $s_1[31:0]$, $c_1[31:0] \Rightarrow sx_1[47:16]$, $cx_1[47:16]$ | (× $2^{16}$) |
| $s_0[31:0]$, $c_0[31:0] \Rightarrow sx_0[31:0]$, $cx_0[31:0]$ | |

Shifting $sx_3/cx_3$, $sx_2/cx_2$, and $sx_1/cx_1$ to the higher order positions effectuates multiplication by a power of 2. Since $sx_3/cx_3$ is shifted by 32 bits, the $A_h \times B_h$ becomes multiplied by $2^{32}$. Similarly for $sx_2/cx_2$ and $sx_1/cx_1$, but the multiplication is $2^{16}$.

The sum/carry lines $sx_3/cx_3$, $sx_2/cx_2$, $sx_1/cx_1$, $sx_0/cx_0$, therefore, represent the intermediate product terms of Eqn. 3. The eight lines feed into 8:2 compression circuit 140 to produce a pair of carry and sum lines 141. Lines 141 feed into 3:2 compressor 160 via selector circuit 116. Selector circuit 112 provides a "0" constant to compressor 160, making the device in essence a pass-through device. Thus, for 32-bit multiplies such as the MMUL.L instruction, the compression circuit 160 is effectively bypassed. The output 141 is latched into P3 without compression, and clocked into stage 3 during the third cycle.

In stage 3, during the third cycle, the intermediate product terms represented by the sum/carry lines 163 feed into adder circuit 170. Referring to FIG. 4, in adder circuit 170, its constituent selector circuits 420–424 are controlled to produce their 'a' inputs by control signals produced in response to decoding the MMUL.L instruction. This causes the carry-out of each full adder 400–402 to propagate into the subsequent adder. Adder 170 is thereby configured as a single four-stage carry-propagate adder. Thus, a single 64-bit addition operation of the incoming sum and carry lines 163 is performed. By comparison, four independent 16-bit additions operations are performed by adder 170 configured in response to decoding the MMUL.W and MMULFX.W instructions. This configurability of adder 170 for use with 32-bit multiplication permits re-use of the circuitry for different-sized data formats without having to design and incorporate logic customized for each data size.

Finally, in accordance with the MMUL.L instruction, the lower 32 bits of the sum (i.e., sum[31:0]) are produced at the output of the adder 170. The masking out of the upper 32 bits is a modulo down-conversion of the 64-bit sum to a 32-bit quantity.

Recall, that the high order longwords $Rm_1$ and $Rn_1$ are concurrently processed in a similar fashion, but are one cycle behind. When processing reaches stage 3 in the fourth cycle, a 64-bit result ($Rm_1 \times Rn_1$) is produced by adder circuit 170. The sum is down-converted to a 32-bit result and combined with the 32-bit result ($Rm_0 \times Rn_0$) from the third cycle into a packed 64-bit result.

MMULFX.L

This is a packed 32-bit fix-point multiply instruction. Each of the two operands Rm, Rn contains two independent 32-bit words. The result Rd comprises two 32-bit values.

Rm: $Rm_{L1}$, $Rm_{L0}$
Rn: $Rn_{L1}$, $Rn_{L0}$
Rd: $Rm_{L1} \times Rn_{L1}$, $Rm_{L0} \times Rn_{L0}$ The instructions are executed in the same manner as discussed above for MMUL.L, with the following differences to account for the fixed-point number format of the operands:

Since a 32-bit×32-bit multiplication results in a 64-bit quantity, the result of each multiplication is down converted to 32 bits with saturation. The down-conversion involves retaining only the most significant 32 bits of the 64-bit result.

As with MMUL.L, the 32-bit multiplication is reduced to 16-bit multiplies per Eqn. 3. Consequently, overflow detection is needed for each 16-bit operation in multiply circuit 120–126 of stage 1. Thus, with reference to FIG. 3, detection logic 130 determines when both of its inputs are −1. When that occurs, selector circuit 330 produces its 'a' inputs. Since saturation generator outputs $(1-2^{-32})$ for MMULFX.L, the sum and carry lines, $c_0$ and $s_0$, will respectively be set to "0" and $(1-2^{-32})$, or vice-versa. This happens for the other sum and carry lines, $s_1/c_1$, $s_2/c_2$, $s_3/c_3$. In this manner, the overflow condition is detected for the intermediate product terms shown in Eqn. 3. Processing then proceeds to stage 3.

In stage 3, overflow detection logic 180 and 186 provide another determination of whether saturation is needed, since the four intermediate product terms may overflow when summed together. Saturation value generator 182 is controlled to produce $1-2^{-32}$ for MMULFX.L. When saturation is required, as determined by logic 180 and 186, selector circuits 118 and 119 will produce the 'a' inputs to output the saturation value rather than the output of adder 170.

MMULLO.WL
MMULHI.WL

These are packed 16-bit, full-width multiply instructions. Each instruction operates either on the low ("LO") two words or on the high ("HI") two words of the operands Rm, Rn. The result operand Rd comprises the two 32-bit product terms. These operations preserve the full 32-bit results of the multiplication.

Rm: $Rm_{w3}$, $Rm_{w2}$, $Rm_{w1}$, $Rm_{w0}$
Rn: $Rn_{w3}$, $Rn_{w2}$, $Rn_{w1}$, $Rn_{w0}$
Rd: $Rn_{w1} \times Rn_{w1}$, $Rm_{w0} \times Rn_{w0}$ (MMULLO.WL)
Rd: $Rm_{w3} \times Rn_{w3}$, $Rm_{w2} \times Rn_{w2}$ (MMULHI.WL)

With respect to FIG. 1, decoding of these instructions will produce appropriate control signals (not shown) to output the contents of Rm to the src1 data lines and the contents of Rn to the src2 data lines. The data is latched into P1 and clocked into selector circuit 110. Selector circuit 110 is controlled to provide the following output of x and y lines:

$x_3=src1[63-48](Rm_{w3})$, $x_2=src1[47-v\ 32](Rm_{w2})$, $x_1=src1[31-16](Rm_{w1})$, $x_0=src1[15-0](Rm_{w0})$ $y_3=src2[63-48](Rn_{w3})$, $y_2=src2[47-32](Rn_{w2})$, $y_1=src2[31-16](Rn_{w1})$, $y_0=src2[15-0](Rn_{w0})$ The x and y lines feed into their respective multiplier circuits 120–126. Sum/carry outputs $s_3/c_3$, $s_2/c_2$, $s_1/c_1$, $s_0/c_0$, are produced at the outputs of multipliers 120–126 and latched into P2. For the purposes of the MMULLO.WL and MMULHI.WL instructions, only the path through circuit 154 is relevant, though the sum/carry pairs in stage 2 feed into transpose circuits 152, 154, and 156.

Transpose circuit 154 is activated by control signals which are produced in response to decoding MMULLO.WL and MMULHI.WL. For MMULLO.WL, transpose circuit 154 is operated so that only the $s_1/c_1$ and $s_0/c_0$ sum/carry lines are selected and packed into 64-bit output lines 155. The $s_3/c_3$ line pair represents the product $Rm_{w1} \times Rn_{w1}$, while lines $s_0/c_0$ represent the product $Rm_{w0} \times Rn_{w0}$. For MMULHI.WL, transpose circuit 154 is operated so that only the $s_3/c_3$ and $s_2/c_2$ sum/carry lines are selected and packed into the 64-bit output lines 155. The $s_3/c_3$ line pair represents the product $Rm_{w3} \times Rn_{w3}$, while lines $s_2/c_2$ represent the product $Rm_{w2} \times Rn_{w2}$. Selector circuits 114 and 116 cooperate to feed output 155 into compression circuit 160. Selector circuit 112 feeds constant "0" into compression circuit 160. As explained above this bypasses compression circuit 160, thereby latching output 155 directly to P3 without compression.

In stage 3, the sum/carry lines 163 feed into adder circuit 170. Referring to FIG. 4, adder circuit 170 is configured as a four-stage carry-propagate adder by control signals produced in response to decoding the MMULO.WL and MMULHI.WL instructions. Thus, selector circuits 420–424 produce their 'a' inputs. This causes the carry-out of each full adder 400–402 to propagate into the subsequent adder. It is noted that only two full adders need to be cascaded, since the product from stage 2 is a 32-bit quantity. The incoming sum and carry lines 163 are combined to produce the final result. For MMULHI.WL, the resulting 32-bit sum is placed in the upper 32 bits of the output of adder 170, whereas for MMULLO.WL the 32-bit sum is placed in the lower 32 bits of the output of the adder.

MMACFX.WL
MMACNFX.WL

These are packed fixed-point, 16-bit, full-width multiply instructions combined with an accumulator (Rd). These instructions operate on only the low order two words of the operands Rm, Rn. The product is summed with (MMACFX.WL) or subtracted from (MMACNFX.WL) the third operand Rd. The final result goes into Rd (denoted here as Rd').

Rm: $Rm_{w1}$, $Rm_{w0}$

Rn: $Rn_{w1}$, $Rn_{w0}$

Rd: $Rd_{L1}$, $Rd_{L0}$ (incoming Rd)

Rd': $Rd_{L1} + Rm_{w1} \times Rn_{w1}$, $Rd_{L0} + Rm_{w0} \times Rn_{w0}$ (MMACFX.WL)

Rd': $Rd_{L1} - Rm_{w1} \times Rn_{w1}$, $Rd_{L0} - Rm_{w0} \times Rn_{w0}$ (MMACNFX.WL)

These instructions execute in a manner similar to MMULLO.WL with the following differences. In stage 1, overflow detection and saturation is performed in a manner similar to the MMULFX.W instruction. The output from stage 1 feeds into transpose circuits 152, 154, and 156 of stage 2. However, for the MMACFX.WL and MMACNFX.WL instructions, circuit 154 is relevant. Circuit 154 selects the $s_1/c_1$ and $s_0/c_0$ sum/carry lines and packs them into 64-bit output lines 155. The output is coupled to compression circuit 160 through selector circuits 114 and 116. The input lines 117 contain $s_1/c_1$ which represent the product $Rm_{w1} \times Rn_{w1}$, and $s_0/c_0$ which represent the product $Rm_{w0} \times Rn_{w0}$.

Selector circuit 112 produces its 'a' input which is the src3 line. Control signals corresponding to the MMACFX.WL and MMACNFX.WL instructions will provide data communication with the general purpose register from register file 102 specified by operand Rd. The output of selector circuit 112 feeds into compression circuit 160. Compression circuit 160 adds $s_1/c_1$ to the upper half of Rd and adds $s_0/c_0$ to the lower part of Rd. The result proceeds into stage 3 through the P3 latch. Note that since each half of Rd is a fixed point number, the multiplication results of Rm and Rn must be left-shifted by 1 to align their respective fixed points with that of the accumulator.

With respect to FIGS. 1 and 4, the outputs 163 from P3 feed into adder circuit 170. Selector circuits 420 and 424 are controlled to produce their respective 'a' inputs, while selector circuit 422 produces its 'b' input. This isolates the adders 400 and 401 from 402 and 403 to create two independent cascade adders. Thus, full adders 400 and 401 are cascaded to provide a 32-bit sum namely, $Rd_{L0} + Rm_{w0} \times Rn_{w0}$, and full adders 402 and 403 are cascaded to provide another 32-bit sum namely, $Rd_{L1} + Rm_{w1} \times Rn_{w1}$. Both of the independent addition operations occur simultaneously. In addition, overflow detection via logic 180 and 186 is provided, outputting $(1 - 2^{-15})$ from saturation generator 182 if overflow is predicted.

With respect to MMACNFX.WL, the additional circuitry in multiplication units 120–126 schematically illustrated in FIG. 5 is activated by control signals CTL1 produced in response to decoding the instruction. Recall that asserting CTL1 results in multiplication of $x_0$ by $-y_0$. This is the effect desired for MMACNFX.WL. Summing $R_d$ with $-(x_0 \times y_0)$ provides the desired effect of subtracting from $R_d$.

MSHLL(R)D.W(L)

MSHARD.W(L)

MSHALDS.W(L)

These are left (right) shifts of packed 16-bit (32-bit) data. The first operand Rm contains four (two) independent 16-bit (32-bit) values. Each is shifted by the same amount as specified in Rn. The result is placed in Rd.

Rm: $Rm_{w3}$, $Rm_{w2}$, $Rm_{w1}$, $Rm_{w0}$ (16-bit)

Rm: $Rm_{L1}$, $Rm_{L0}$ (32-bit)

Rn: n (shift amount)

Rd: $Rm_{w3} << n$, $Rm_{w2} << n$, $Rm_{w1} << n$, $Rm_{w0} << n$ (left shift, 16-bit)

Rd: $Rm_{w3} >> n$, $Rm_{w2} >> n$, $Rm_{w1} >> n$, $Rm_{w0} >> n$ (right shift, 16-bit)

Rd: $Rm_{L1} << n$, $Rm_{L0} << n$ (left shift, 32-bit)

Rd: $Rm_{L1} >> n$, $Rm_{L0} >> n$ (right shift, 32-bit)

The logical shifts MSHLL(R)D.W(L) do not involve saturation. Similarly for arithmetic right shifts MSHARD.W(L), there is no issue with saturation. Right shifts are divide-by-two operations, and so the final value is always smaller than the starting value. However, sign extension must be provided for right shifts. For arithmetic left shifts MSHALDS.W(L), saturation is provided if needed.

Figure 7:
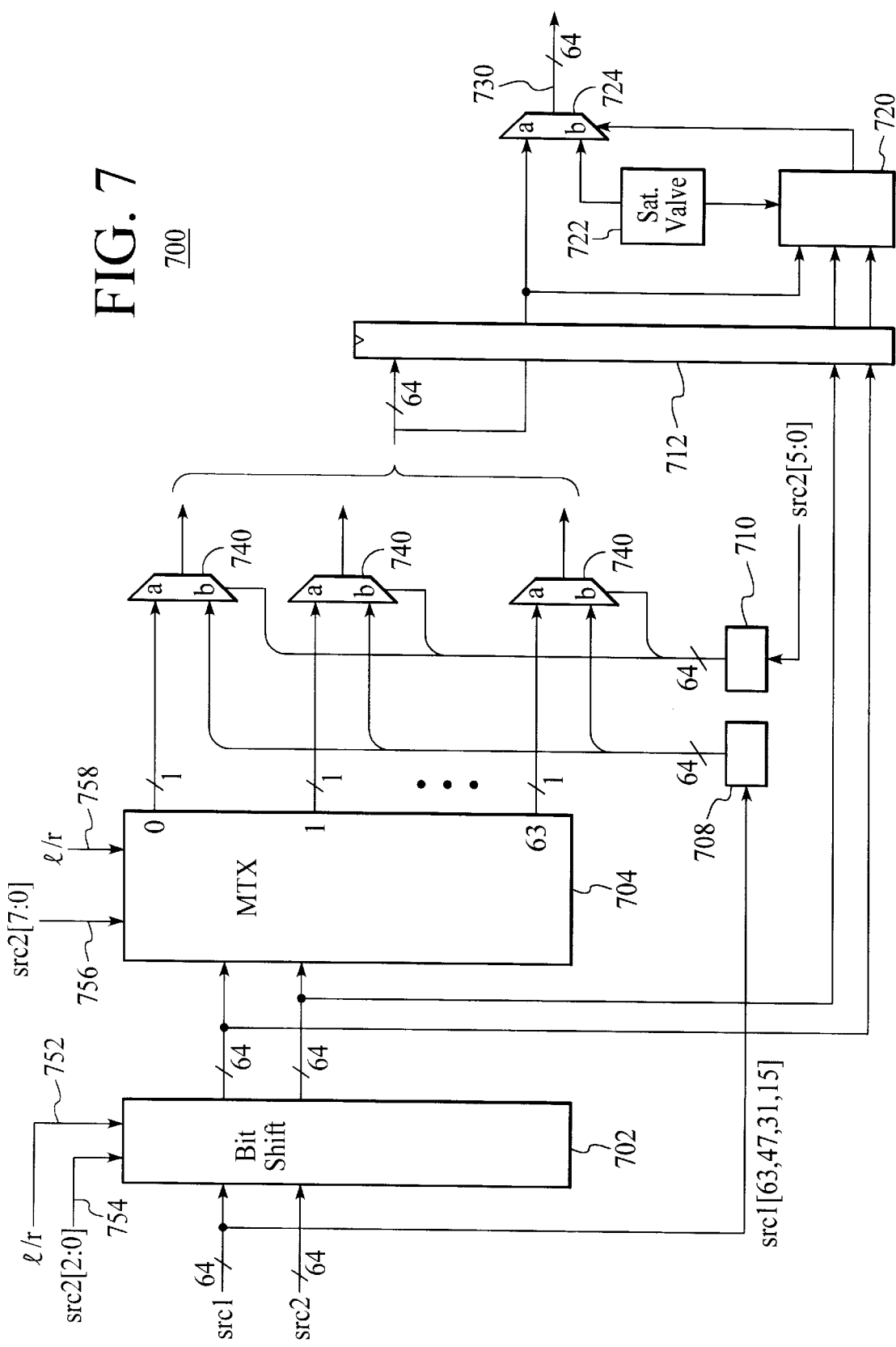
FIG. 7 shows a vector transposition unit in connection with certain multimedia instructions of the invention.

Referring to FIG. 7, decoding any of the logical shift instructions MMSHLLD.W, MMSHLRD.W, MMSHLLD.L, or MMSHLRD.L produces control signals which operate bit shifter 702 and matrix 704. The shift amount is contained in the lowest byte in src2. The three lowest bits of src2 ($src2_2$, $src2_1$, $src2_0$) feed into the shift amount input 754. It can be seen that the lowest three bits is the shift amount modulo 8. An appropriate up/down control signal is generated depending on the instruction, and fed into control 752. Consequently, bit shifter 702 will make a bit-level left or a right shift of the src1 input by an amount (0–7 places) specified by the amount input 754. The output of bit shifter 702 feeds into matrix 704. The next three bits in the src2 byte ($src2_5$, $src2_4$, $src2_3$) feed into control input 756 of matrix 704. This control input specifies the number of 8-bit (byte-level) shifts to be performed on its input.

This two-phase arrangement of a bit-level shift followed by a byte-level shift accommodates both 16-bit and 32-bit shifts. For example, consider a shift of 21 bit positions. Input src2 would contain $010101_2$ which is 21 base 10. Thus, bit shifter 702 would shift $101_2$ bit positions namely, a shift of 5. Matrix 704 would provide an additional $010_2$ byte-level shifts namely, a shift of 16 bit positions, for a total shift of 21 bit positions. The output of matrix 704 feeds into the 'a' inputs of selector circuits 740. The 'b' inputs of selector circuits 740 receive an output from sign generator 708. The selectors are controlled by an output from mask generator 710.

Figure 9:
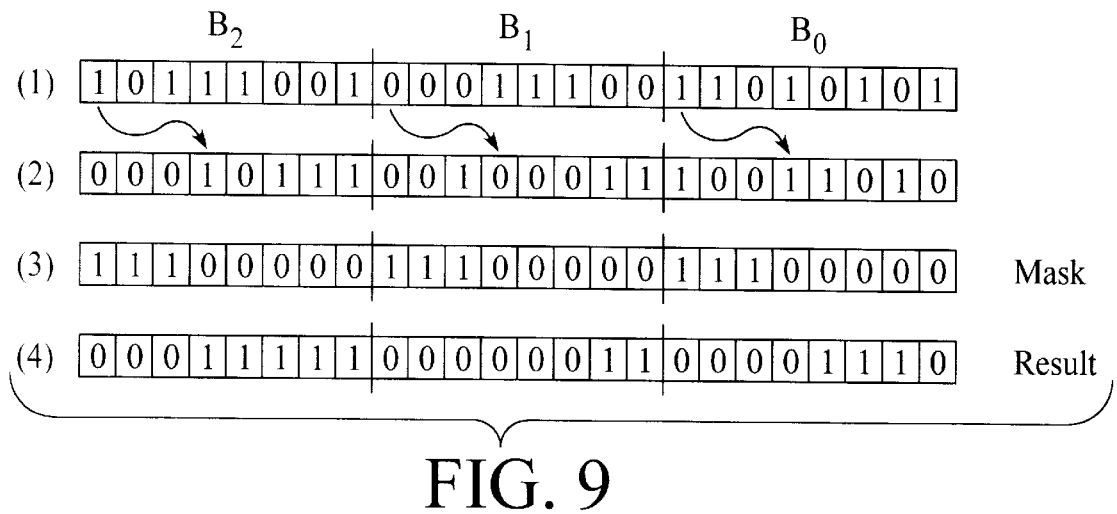
FIGS. 9 and 10 illustrate the manipulations in reference to FIG. 8 during execution of certain multimedia instructions of the invention.

Refer now to FIGS. 7 and 9 for a discussion of the function of sign generator 708 and mask generator 710. Consider the 24-bit register in FIG. 9, which is divided into three 8-bit elements. The discussion which follows applies to the 16-bit and 32-bit data formats of the instructions MMSHLLD.W, MMSHLRD.W, MMSHLLD.L, and MMSHLRD.L. At step (1), the three initial values are: B2=10111001, B1=00011100, B0=11010101. Suppose a 3-bit right shift is desired. Simply shifting the register by three bits would produce the contents shown at step (2). B2 correctly contains 10111; however, B1 contains 00100011 and B0 contains 10011010. B1 and B0 are incorrect because simply shifting the register contents does not take into account the independent aspect of elements B2, B1, and B0. Consequently, bytes B1 and B0 receive 'spill-over' bits from the adjacent byte.

In accordance with the invention, mask generator 710 produces the mask pattern shown in (3), which controls selector circuits 740. Further in accordance with the invention, sign generator 708 outputs zeroes on its 64 bitlines which feeds a zero into each of the 'b' inputs of selector circuits 740. Thus, where a '1' occurs in the mask pattern, the selector circuit produces its 'b' input which is '0'. Where a '0' occurs in the mask pattern, the selector circuit produces its 'a' input which is the shifted-register content. The bit pattern at the output of selector circuits 740 (shown at step 4 in FIG. 9, for example) represents properly shifted elements for the given data format; i.e., 16-bit, 32-bit, and so on. The mask generator 710 and sign generator 708 cooperate to effectively mask out the spill-over bits from the adjacent elements.

For the instructions MMSHLLD.W, MMSHLRD.W, MMSHLLD.L, and MMSHLRD.L, the sign generator always outputs all '0's. For this reason, the sign generator is more accurately described as an "alternate value" generator since there is no concept of a "sign" for logical shift instructions. The mask generator 710 produces the correct pattern size (e.g., 16-bit, 32-bit) in response to control signals corresponding to these instructions. The pattern itself is created based on the shift amount contained in the src2 byte, which feeds into the mask generator. As can be seen from (3) in FIG. 9, the pattern for right shifts will have a contiguous run of '0's, as many as specified by the shift amount in src2, and left-padded with a contiguous run of '1's to complete the pattern for the appropriate data size. In reference to FIG. 9, the mask pattern for byte B2 shows a run of five contiguous '0's (the shift amount) and a run of three '1's. As can be surmised, the pattern for left shifts will have as many '0's as specified by the shift amount, but right-padded with enough '1's to complete the pattern for the given data size.

Figure 10:
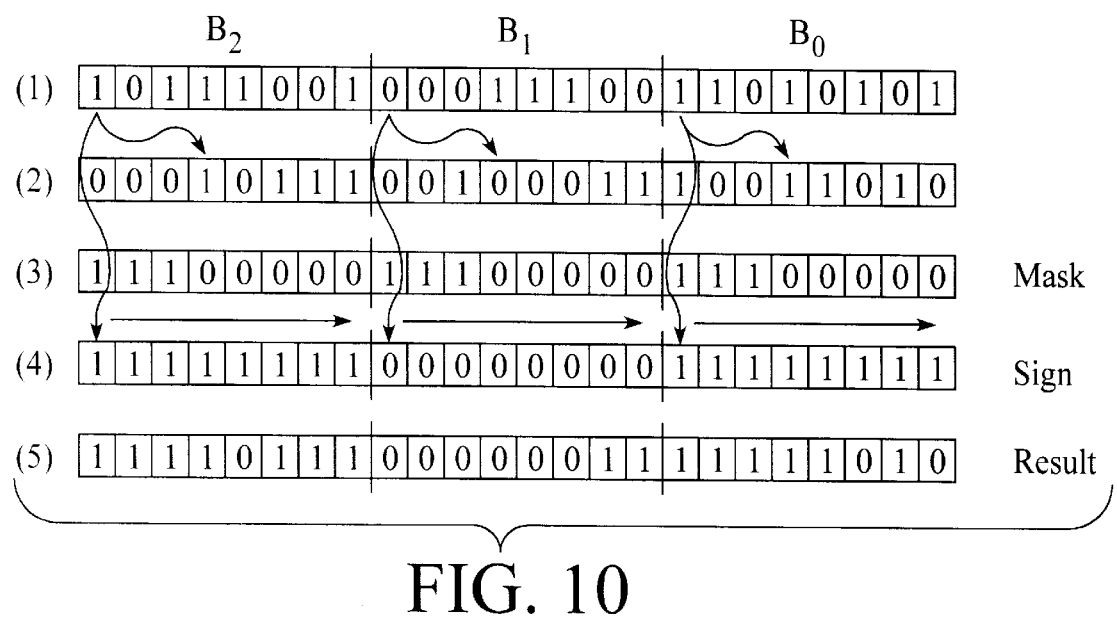

Refer now to FIGS. 7 and 10 in reference to the signed shift instructions MSHARD.W and MSHARD.L. Again, consider a 24-bit register organized as three 8-bit elements. At step (1), the three initial values are: B2=10111001, B1=00011100, B0=11010101. Suppose a 3-bit arithmetic right shift is desired. As before, simply shifting the entire contents of the register by three positions would produce the incorrect results shown at step (2) because of the spill-over bits from adjacent bytes. Moreover, bytes B2 and B0 are negative numbers which requires sign extension when right-shifted. FIG. 10 shows B2 and B0 to be positive numbers at (2).

For MSHARD.W and MSHARD.L, mask generator 710 operates in the same manner, outputting the same bit pattern as discussed above in FIG. 9. Sign generator 708, on the other hand, operates differently. As can be seen in FIG. 10, the sign generator output (4) is a pattern of eight '1's corresponding to each of B2 and B0 and a pattern of '0's corresponding to B1. As can be seen, feeding the sign pattern into the 'b' inputs of selectors 740 and operating each selector according to the mask pattern not only produces properly shifted outputs for B2, B1, and B0, but also with proper sign-extension.

Referring to FIG. 7, bits $src1_{63}$, $src1_{47}$, $src1_{31}$, and $src1_{15}$ feed into sign generator 708. These are the sign bits for the 16-bit data format. For the 32-bit data format, the sign bits are $src1_{63}$ and $src1_{31}$. The sign generator outputs patterns of '1's or '0's depending on these sign bits. The length of the pattern is determined by control signals corresponding to the decoded MSHARD.W (16-bit) or MSHARD.L (32-bit) instruction.

Referring to FIG. 7 in connection with the MSHALDS.W and MSHALDS.L instructions, the overflow detector 720 determines from the output of matrix 704 whether the resulting left shift operation produces overflow. Saturation value generator 722 specifies the upper limit used in detector 720 depending on the data size, $2^{16}-1$ (16-bit) or $2^{32}-1$ (32-bit). If an overflow is predicted, then the saturation value is produced by selector circuit 730.

MSHARDS.O

This is an arithmetic right shift instruction on a signed, 64-bit source Rm. The shift amount is specified in Rn. The result is down-converted to a signed, 16-bit value with saturation and then placed in Rd. This instruction is executed in substantially the same manner as the foregoing logical and arithmetic shifts. The sign generator 708 uses $src1_{63}$ as the single sign bit for a 64-bit pattern of all '0's or all '1's. The mask generator 710 operates as discussed above in connection the other shift operations. Overflow detection is provided by detector 720, comparing against an overflow value of $2^{16}-1$.

MCNVS.WB
MCNVS.WUB

These are down-conversion instructions which convert four signed, 16-bit data in each of operands Rm and Rn to 8-bit values. The down-converted data are represented by Rm' and Rn'. The eight 8-bit results are either signed (MCNVS.WB) or unsigned (MCNVS.WUB) and are placed in Rd. Saturation on the 8-bit results is performed as needed.

Rm: $Rm_{w3}$, $Rm_{w2}$, $Rm_{w1}$, $Rm_{w0}$

Rn: $Rn_{w3}$, $Rn_{w2}$, $Rn_{w1}$, $Rn_{w0}$

Rd: $Rn'_{w3}$, $Rn'_{w2}$, $Rn'_{w1}$, $Rn'_{w0}$, $Rm'_{w3}$, $Rm'_{w2}$, $Rm'_{w1}$, $Rm'_{w0}$

Referring to FIG. 7, src1 and src2 are the operands for the down-conversion. The bit shifter 702 does not participate in the execution of these instructions, passing src1 and src2 unaffected into matrix 704. Matrix 704, on the other hand performs the mapping required to effectuate the down-conversion. In response to control signals associated with either instruction, matrix 704 produces at its output the lower eight bits from each of the four 16-bit groups in each of src1 and src2. The eight bits are packed into the 64-bit output of the matrix. Overflow detection is performed and saturation is provided for each of the eight 8-bit fields.

MCNVS.LW

This is a down-conversion instruction which converts two 32-bit data in each of operands Rm and Rn to 16-bit values. The down-converted data are represented by Rm' and Rn'. The four signed, 16-bit results are placed in Rd. Saturation on the 16-bit results is performed as needed.

Rm: $Rm_{L1}$, $Rm_{L0}$

Rn: $Rn_{L1}$, $Rn_{L0}$

Rd: $Rn'_{L1}$, $Rn'_{L0}$, $Rm'_{L1}$, $Rm'_{L0}$

This instruction is executed in essentially the same manner as discussed above for MCNVS.WB and MCNVS.WUB, but on 32-bit packed sources, src1 and src2, and producing 16-bit results.

MSHFHI.B
MSHFLO.B

These instructions shuffle (interleave) 8-bit data in either the upper (HI) or lower (LO) halves of operands Rm and Rn and place the result into Rd.

Rm: $Rm_{b7}$, $Rm_{b6}$, $Rm_{b5}$, $Rm_{b4}$, $Rm_{b3}$, $Rm_{b2}$, $Rm_{b1}$, $Rm_{b0}$

Rn: $Rn_{b7}$, $Rn_{b6}$, $Rn_{b5}$, $Rn_{b4}$, $Rn_{b3}$, $Rn_{b2}$, $Rn_{b1}$, $Rn_{b0}$

Rd: $Rn_{b7}$, $Rm_{b7}$, $Rn_{b6}$, $Rm_{b6}$, $Rn_{b5}$, $Rm_{b5}$, $Rn_{b4}$, $Rm_{b4}$ (MSHFHI.B)

Rd: $Rn_{b3}$, $Rm_{b3}$, $Rn_{b2}$, $Rm_{b2}$, $Rn_{b1}$, $Rm_{b1}$, $Rn_{b0}$, $Rm_{b0}$ (MSHFLO.B)

Referring to FIG. 7, src1 and src2 are the operands for the down-conversion. The bit shifter 702 does not participate in the execution of these instructions, passing src1 and src2 unaffected into matrix 704. Matrix 704, on the other hand performs the mapping required to effectuate the interleave. In response to control signals associated with either instruction, matrix 704 interleaves, at its output, the four bytes in each of the lower (MSHFLO.B) or upper (MSHFHI.B) half of each of src1 and src2. The output of matrix 704 then passes through to output 730.

MSHFHI.W
MSHFLO.W

These instructions shuffle (interleave) 16-bit data in either the upper (HI) or lower (LO) halves of operands Rm and Rn and place the result into Rd.

Rm: $Rm_{w3}$, $Rm_{w2}$, $Rm_{w1}$, $Rm_{w0}$

Rn: $Rn_{w3}$, $Rn_{w2}$, $Rn_{w1}$, $Rn_{w0}$

Rd: $Rn_{w3}$, $Rm_{w3}$, $Rn_{w2}$, $Rm_{w2}$ (MSHFHI.W)

Rd: $Rn_{w1}$, $Rm_{w1}$, $Rn_{w0}$, $Rm_{w0}$ (MSHFLO.W)

These instructions are executed in essentially the same manner as discussed above for MSHFHI(LO).B, but on the two 16-bit words in each of the upper (lower) half of each of src1 and src2.

MSHFHI.L
MSHFLO.L

These instructions shuffle (interleave) 32-bit data in either the upper (HI) lower (LO) halves of operands Rm and Rn and place the result into Rd.

Rm: $Rm_{L1}$, $Rm_{L0}$

Rn: $Rn_{L1}$, $Rn_{L0}$

Rd: $Rn_{L1}$, $Rm_{L1}$ (MSHFFHI.)

Rd: $Rn_{L0}$, $Rm_{L0}$ (MSHFLO.L)

These instructions are executed in essentially the same manner as discussed above for MSHFHI(LO).B and MSHFHI(LO).W, but on the 32-bit long word in each of the upper (lower) half of each of src1 and src2.

MPERM.W

This instruction permutes the order of four packed 16-bit data in source operand Rm in accordance with the permutation specified in the control operand Rn. The result goes into result operand Rd. For each of the four 16-bit fields in the result operand, a 2-bit identifier in the control operand determines which 16-bit field from the source operand is copied into that result field. In one embodiment, the lowest eight bits of src2 contain the four 2-bit identifiers. Thus, if src1 comprises four 16-bit fields $src1_{w3}$, $src1_{w2}$, $src1_{w1}$, and $src1_{w0}$, then src2: 101100012 results in src3: $src1_{w2}$, $src1_{w3}$, $src1_{w0}$, $src1_{w1}$, src2: 001011012 results in src3: $src1_{w0}$, $src1_{w2}$, $src1_{w3}$, $src1_{w1}$, src2: 111000112 results in src3: $src1_{w3}$, $src1_{w2}$, $src1_{w0}$, $src1_{w3}$, and so on.

The last example illustrates that a 16-bit field in the source can be replicated multiple times in the destination.

Referring now to FIG. 7, bit shifter 702 does not participate in MPERm.W and so src1 and src2 pass through the bit shifter unaltered and into matrix 704. The id bits in src2 feed into control input 756 of matrix 704. Control signals produced in response to decoding the MPERM instruction feed into matrix 704. Based on the id bits, matrix 704 produces at its output the specified permutation.

Figure 11:
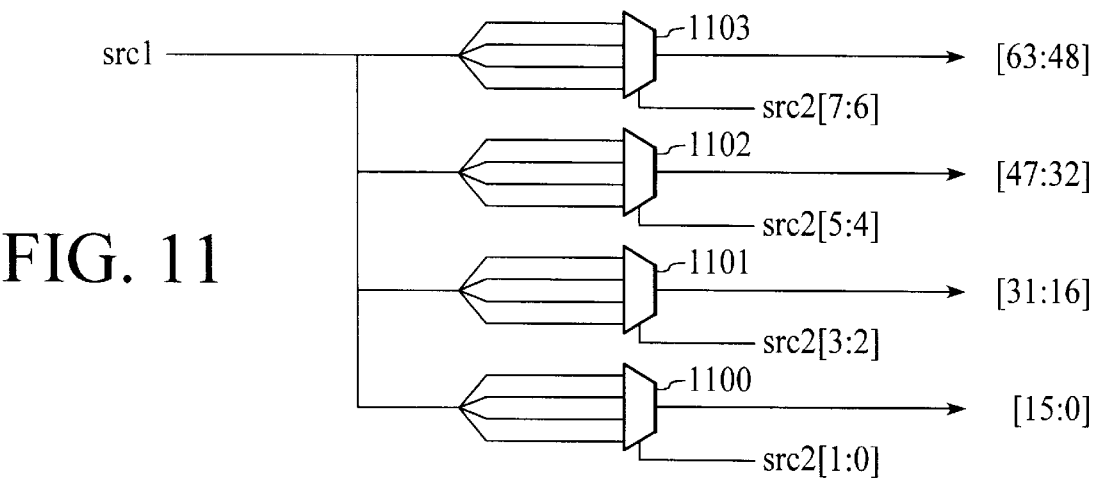
FIG. 11 shows logic used in the matrix shown in FIG. 8 in connection with certain multimedia instructions of the invention.

FIG. 11 shows the selection that occurs for MPERM. The 64 bitlines of incoming src1 feed into each of selector circuits 1103–1100. More specifically, each selector comprises four 16-bit inputs. Each of the four 16-bit fields of src1 feeds into a corresponding input. The src2 id bits feed into the select inputs of the selectors. Bits 1,0 control selector 1100, bits 3,2 control selector 1101, bits 5,4 control selector 1102, and bits 7,6 control selector 1103. Each selector output corresponds to one of the 16-bit result fields, indicated in FIG. 11 by its corresponding bit positions. Each selector 1103–1100 can therefore produce any of the four 16-bit fields of src1 to any of the four 16-bit fields of src3. These lines are ultimately combined into a single 64-bit output for the MPERM instruction.

EXTRm–MEXTR7

These instructions extract 8 bytes across two concatenated registers Rm and Rn, offset from the right by 1–7 bytes. The extracted bytes are placed in Rd. Rm, Rn: $Rm_{b7}$, $Rm_{b6}$, $Rm_{b5}$, $Rm_{b4}$, $Rm_{b3}$, $Rm_{b2}$, $Rm_{b1}$, $Rm_{b0}$, $Rn_{b7}$, $Rn_{b6}$, $Rn_{b5}$, $Rn_{b4}$, $Rn_{b3}$, $Rn_{b2}$, $Rn_{b1}$, $Rn_{b0}$ Rd: $Rm_{b0}$, $Rn_{b7}$, $Rn_{b6}$, $Rn_{b5}$, $Rn_{b4}$, $Rn_{b3}$, $Rn_{b2}$, $Rn_{b1}$ (MEXTR1)

Rd: $Rm_{b1}$, $Rm_{b0}$, $Rn_{b7}$, $Rn_{b6}$, $Rn_{b5}$, $Rn_{b4}$, $Rn_{b3}$, $Rn_{b2}$ (MEXTR2)

Rd: $Rm_{b2}$, $Rm_{b1}$, $Rm_{b0}$, $Rn_{b7}$, $Rn_{b6}$, $Rn_{b5}$, $Rn_{b4}$, $Rn_{b3}$ (MEXTR3)

Rd: $Rm_{b3}$, $Rm_{b2}$, $Rm_{b1}$, $Rm_{b0}$, $Rn_{b7}$, $Rn_{b6}$, $Rn_{b5}$, $Rn_{b4}$ (MEXTR4)

Rd: $Rm_{b4}$, $Rm_{b3}$, $Rm_{b2}$, $Rm_{b1}$, $Rm_{b0}$, $Rn_{b7}$, $Rn_{b6}$, $Rn_{b5}$ (MEXTR5)

Rd: $Rm_{b5}$, $Rm_{b4}$, $Rm_{b3}$, $Rm_{b2}$, $Rm_{b1}$, $Rm_{b0}$, $Rn_{b7}$, $Rn_{b6}$ (MEXTR6)

Rd: $Rm_{b6}$, $Rm_{b5}$, $Rm_{b4}$, $Rm_{b3}$, $Rm_{b2}$, $Rm_{b1}$, $Rm_{b0}$, $Rn_{b7}$ (MEXTR7)

Referring to FIG. 7, Rm feeds into src1 and Rn feeds into src2. Bit shifter 702 takes no action on src1 and src2, passing them unaltered to matrix 704. Matrix 704 selects the appropriate number of contiguous bytes from src1 and produces them at corresponding positions in the high order portion of its output. Matrix 704 then selects the appropriate number of contiguous bytes from src2 and produces them at corresponding positions in the low order portion of its output. Control signals corresponding to each of the MEXTR* instructions specify how many bytes in each of src1 and src2 are selected.

MCMV

This instruction performs a conditional bitwise copy of bits from operand Rm into corresponding bit positions in destination Rd based on the bit setting of the corresponding bit in mask Rn.

Rm: $Rm_{63}$, $Rm_{62}$, . . . $Rm_1$, $Rm_0$

Rd: $Rd_n \leftarrow Rm_n$ if $Rn_n$ is set

Referring to the logic shown in FIG. 8, operand register Rm feeds into src1 and mask register Rn feeds into src2. Destination register Rd also feeds into the logic as src3. Each corresponding pair of bits in src1 and src3 is coupled respectively to the 'a' and 'b' inputs of a selector circuit 801–863. Each bit in src2 controls a selector circuit.

In operation, each selector circuit 801–863 will produce its 'a' input namely, $src1_n$, if the corresponding bit in src2 namely, bit position n, is in a first logic state. Similarly, input 'b' is produced namely, src3, if the bit in bit position n of src2 is in a second logic state. The outputs of the selector circuits 801–863 are combined to form the 64-bit output 880.

Thus, bits from src1 and src3 are conditionally copied to output 880 depending on the logic state of the correspondingly positioned bits in src2. The output 880 is fed back into destination register Rd. Consequently, this has the effect of providing an instruction which conditionally moves bits from a source register Rm into a destination register Rd based on the contents of a mask register Rn.

MSAD

This function performs the sum-of-differences operation on the eight bytes contained in Rm and Rn. The result is summed into Rd. This operation is represented by the following:

$$Rd = Rd + \sum_{i=0}^{7} |Rm_i - Rn_i|.$$

Referring to FIG. 6, operands Rm and Rn feed into src1 and src2 respectively. For the MSAD instruction, selector 110 produces the following 16-bit mapping of src1 and src2 to the 16-bit x and y data lines:

| 16-bit mapping | |
|---|---|
| src1[63:48] ⇒ $x_3$ | src2[63:48] ⇒ $y_3$ |
| src1[47:32] ⇒ $x_2$ | src2[47:32] ⇒ $y_2$ |
| src1[31:16] ⇒ $x_1$ | src2[31:16] ⇒ $y_1$ |
| src1[15:0] ⇒ $x_0$ | src2[15:0] ⇒ $y_0$ |

However, for the MSAD instruction, src1 and src2 each comprise eight 8-bit data elements. Consequently, as shown in FIG. 6, each of the 16-bit $x_n$ and $y_n$ data lines are further divided into 8-bit lines. This produces the 8-bit data elements in src1 and src2 for this instruction.

Each 8-bit line pair x/y feeds into one of subtraction units 601–608. As discussed above in connection with FIG. 6, each subtraction unit produces the absolute value of the difference between its inputs. The outputs of the subtractors 601–608 are selected by selector circuit 660, rather than the multiplication results of circuits 120–126, and latched into P2 for processing in stage 2.

Referring to FIG. 1, the subtractor outputs are packed by transpose circuit 152 into a pair of 64-bit sum and carry lines 153. Selector circuits 114 and 116 feed lines 153 into compression circuit 160. For the MSAD instruction, operand Rd is coupled to src3, which is picked up by selector circuit 112 and fed into compressor 160. The compression circuit combines its inputs to produce output 161, which is fed to stage 3 via the P3 latches.

In stage 3, adder circuit 170 produces the final sum. It's 32-bit outputs are combined by selector circuits 118 and 119 to produce the desired 64-bit sum of absolute differences output combined with Rd. Referring to FIG. 4, adder circuit 170 is configured by control signals corresponding to the MSAD instruction to operate as a single 4-stage carry-propagate adder. Thus, selector circuits 420–424 are controlled to produce their 'a' inputs. This causes the carry-out of each full adder 400–402 to propagate into the subsequent adder. As a result 64-bit addition of the incoming sum and carry lines 163 is performed.

What is claimed is:

1. In a processing core having a register file and an arithmetic unit, the arithmetic unit comprising:
    a first set of input data lines effective for receiving the contents of a first register selected from the register file;
    a second set of input data lines effective for receiving the contents of a second register selected from the register file;
    a first multiplexer having mux input lines and mux output lines, the mux inputs in data communication with the first and second sets of input data lines, the mux inputs being grouped as subsets of mux input lines, the mux outputs being grouped as subsets of mux output lines;
    a plurality of multiplication circuits, each having inputs in data communication with one of the subsets of mux output lines, the multiplication circuits each having an intermediate output;
    a first adder circuit having inputs in data communication with the intermediate outputs and having an output, the first adder effective for outputting a product term corresponding to each of the intermediate outputs;
    a second adder circuit having inputs in data communication with the intermediate values and having an output, the second adder effective for outputting a single product term from the intermediate values; and
    a second multiplexer having inputs in data communication with the outputs of the first adder and the output of the second adder and having an output, whereby either the outputs of the first adder or the output of the second adder are produced at the output of the second multiplexer.

2. The processor core of claim 1 wherein each of the multiplier circuits is a Wallace tree multiplier producing a carry output and a sum output.

3. The processor core of claim 2 wherein the first adder circuit is a carry-propagate adder.

4. The processor core of claim 3 wherein the second adder includes a compression circuit and a carry-propagate adder in data communication with an output of the compression circuit.

5. The processor core of claim 1 wherein each multiplication circuit includes an associated overflow prediction circuit, each overflow prediction circuit having inputs in data communication with the inputs of its associated multiplication circuit and having an output; each multiplication circuit further including an associated selector for outputting either its intermediate output value or a predetermined value, the selector having a selector input coupled to the output of the overflow/underflow prediction circuit.

6. The processor core of claim 1 wherein the second adder circuit includes an associated second overflow prediction circuit, the second overflow prediction circuit having inputs in data communication with the inputs of the second adder circuit and having an output; the second adder circuit further having an associated second selector for outputting either the output of the second adder circuit or a predetermined value, the selector having a selector input coupled to the output of the second overflow prediction circuit.

7. In a processing core having a multiplication unit, the multiplication unit having first, second, and third inputs, the multiplication unit comprising a first selector coupled to receive the inputs, a set of multiply circuits coupled to receive outputs of the first selector, a first, a second and a third transform path, each transform path producing a different data transformation on the outputs of the multiplier circuits, a second selector coupled to receive the transform paths, a compression circuit coupled to receive an output of the second selector and to receive the third input, and an adder circuit coupled to receive outputs of the second selector, a method for multiplying comprising steps of:
    decoding a first instruction to produce first control signals and in response to the first control signals:
    providing first and second data to the first selector, the first selector dividing the first and second data into subgroups;
    applying the subgroups to the multiply circuits according to a first sequence;
    selecting data from the first transformation path to the compression circuit;
    bypassing the compression circuit; and
    performing an single addition operation in the adder circuit.

8. The method of claim 7 wherein the first instruction is a 32-bit multiply instruction.

9. The method of 8 wherein the first sequence of subgroups of the first and second data are multiplied as two binomial terms.

10. The method of claim 8 further including:
    decoding a second instruction to produce second control signals and in response to the second control signals:
    providing third and fourth data to the first selector, the first selector dividing the third and fourth data into subgroups;

applying the subgroups to the multiply circuits according to a second sequence;
selecting data from the second transformation path to the compression circuit;
bypassing the compression circuit; and
performing a single addition operation in the adder circuit.

11. The method of claim 10 further including:
decoding a third instruction to produce third control signals and in response to the third control signals:
providing fifth and sixth data to the first selector, the first selector dividing the fifth and sixth data into subgroups;
applying the subgroups to the multiply circuits according to the second sequence;
selecting data from the third transformation path to the compression circuit;
bypassing the compression circuit; and
simultaneously performing four independent addition operations in the adder circuit.

12. The method of claim 11 further including:
decoding a third instruction to produce third control signals and in response to the third control signals:
providing seventh and eighth data to the first selector, the first selector dividing the seventh and eighth data into subgroups;
applying the subgroups to the multiply circuits according to the second sequence;
selecting data from the second transformation path to the compression circuit;
operating the compression circuit to combine the data from the second transformation path with the third input; and
simultaneously performing-two independent addition operations in the adder circuit.

* * * * *